(12) United States Patent
Kita

(10) Patent No.: US 7,536,092 B2
(45) Date of Patent: May 19, 2009

(54) CAMERA WHICH INCORPORATES A LENS UNIT THAT CAN PROGRAM AN OPTICAL PROPERTY COMPRISING A SELECTION UNIT

(75) Inventor: Kazunori Kita, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 497 days.

(21) Appl. No.: 11/239,413

(22) Filed: Sep. 29, 2005

(65) Prior Publication Data

US 2006/0066726 A1   Mar. 30, 2006

(30) Foreign Application Priority Data

Sep. 30, 2004   (JP) .............................. 2004-287951

(51) Int. Cl.
  *G03B 17/00*   (2006.01)
  *G03B 13/18*   (2006.01)
  *G03B 3/00*    (2006.01)
(52) U.S. Cl. .............................. 396/72; 396/79; 396/89
(58) Field of Classification Search ................... 396/72, 396/79–83, 88, 89, 147; 348/240.3, 345, 348/335, 346, 333.02, 333.04
See application file for complete search history.

(56) References Cited

U.S. PATENT DOCUMENTS

| 3,598,479 | A |   | 8/1971 | Wright |
| 4,825,237 | A | * | 4/1989 | Hatase et al. ................. 396/79 |
| 4,899,190 | A | * | 2/1990 | Hata ........................... 396/76 |
| 4,951,075 | A | * | 8/1990 | Tokumaru et al. ............. 396/78 |
| 5,138,494 | A |   | 8/1992 | Kurtin |
| 5,305,049 | A | * | 4/1994 | Miyazaki et al. .............. 396/63 |
| 5,668,620 | A |   | 9/1997 | Kurtin et al. |
| 5,757,549 | A |   | 5/1998 | Sumi |
| 6,437,920 | B1 | * | 8/2002 | Wohlstadter ................ 359/626 |

(Continued)

FOREIGN PATENT DOCUMENTS

JP         40-28614        10/1940

(Continued)

OTHER PUBLICATIONS

Koishi Asano (online "Development of positive electrode reaction field evaluation technique in a fused carbonate type fuel cell-study of wetting mechanism of fused carbonate by impressed voltage" (2 pages).

(Continued)

*Primary Examiner*—Jay M Patidar
(74) *Attorney, Agent, or Firm*—Frishauf, Holtz, Goodman & Chick, P.C.

(57) ABSTRACT

A group of optical elements of a zoom lens unit has variable-focal-length lenses whose optical properties can be adjusted. A camera having this zoom lens unit incorporated therein includes a program memory which stores therein a plurality of mocking design data with respect to a group of parameters having any of a plurality of variable design parameters for the zoom lens unit. The camera also has a control unit into which designation information is inputted by the user which designates any one of the plurality of mocking design data and a control unit which controls the variable design parameters based on the mocking design data designated by the designation information, so that a desired optical property can easily be obtained.

22 Claims, 32 Drawing Sheets

U.S. PATENT DOCUMENTS

| | | | |
|---|---|---|---|
| 6,683,725 B2 * | 1/2004 | Wohlstadter | 359/626 |
| 6,824,059 B2 | 11/2004 | Jam et al. | |
| 6,925,253 B2 * | 8/2005 | Miyatake | 396/79 |
| 7,016,122 B2 * | 3/2006 | Okawara | 359/696 |
| 2006/0198621 A1 * | 9/2006 | Triteyaprasert | 396/79 |

FOREIGN PATENT DOCUMENTS

| | | |
|---|---|---|
| JP | 51-49956 | 12/1976 |
| JP | 55-36857 A | 3/1980 |
| JP | 6-308303 A | 11/1994 |
| JP | 11-513129 A | 11/1999 |
| JP | 2000-81504 A | 3/2000 |
| JP | 2001-13306 A | 1/2001 |
| JP | 3158016 B2 | 2/2001 |
| JP | 2001-519539 A | 10/2001 |
| JP | 2002-243918 A | 8/2002 |
| JP | 2002-311213 A | 10/2002 |
| JP | 2003-14909 A | 1/2003 |
| JP | 3400270 B2 | 2/2003 |

OTHER PUBLICATIONS

U.S. Appl. No. 11/239,612 filed Sep. 29, 2005; K. Kita; Optical Unit Which Can Program Optical Properties and Camera Incorporating Optical Unit Which Can Program Optical Properties.

Article entitled "Electrocapillarity and Wetting of Insulator Films by Water", C. R. Acad. Sci. Paris t.317 Serie II, p. 157-163, Jul. 22, 1993.

Article entitled "Optical Properties and Molecular Orientation in a Hybrid-Aligned Liquid Crystal Electrooptical Microlens", by Shin Masuda, et al, Optics, vol. 20, No. 4, Apr. 1991.

* cited by examiner a: GLYCIN
b: $\beta$-ALANINE
c: $\alpha$-ALANINE
d: $\beta$-AMINOBUTYRIC ACID
e: BETAINE
f: $\varepsilon$-AMINOCAPRONIC ACID
g: $\alpha$-AMINOBUTYRIC ACID
h: $\alpha$-AMINOCAPRONIC ACID

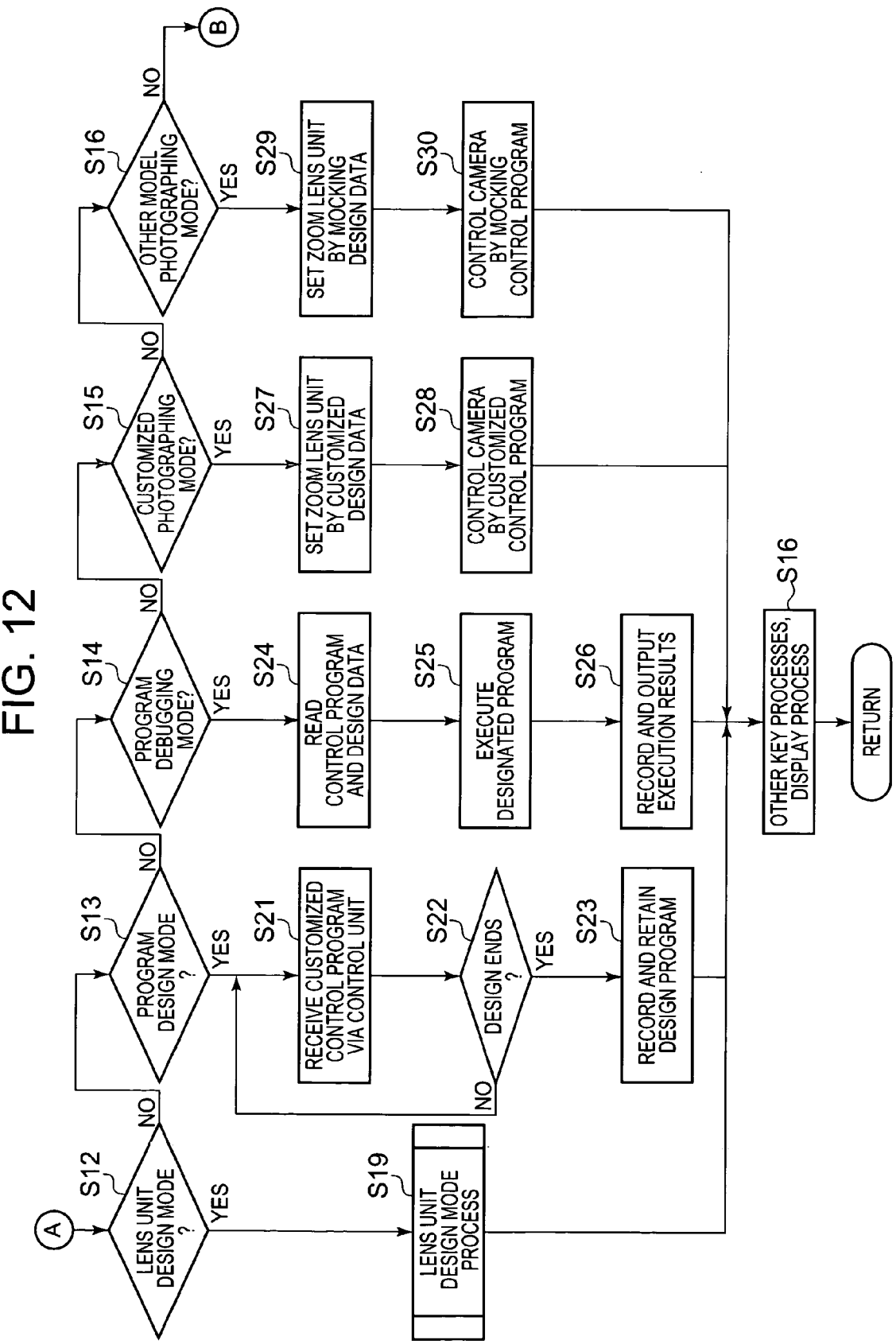

FIG. 19A

| AUXILIARY AMOUNT | CALCULATING EQUATIONS |
|---|---|
| $Q_j$ | $Q_j = n_j(1/r_j - 1/s_j)$ |
| $Q_j^*$ | $Q_j^* = n_j(1/r_j - 1/s_j^*)$ |
| $\Delta(1/n_j s_j)$ | $\Delta(1/n_j s_j) = 1/(n'_j \cdot s'_j) - 1/(n_j \cdot s_j)$ |
| $\Delta(1/n_j)$ | $\Delta(1/n_j) = 1/n'_j - 1/n_j$ |
| $J_j$ | $J_j = (h_j^* \cdot Q_j^*)/(h_j \cdot Q_j)$ |

FIG. 19B

| SEIDEL ABERRATION | | CALCULATING EQUATIONS |
|---|---|---|
| I | SPHERICAL ABERRATION (SA) | $I = \Sigma I_j = \Sigma h_j^4 Q_j^2 \cdot \Delta(1/n_j s_j)$ |
| II | COMA ABERRATION | $II = \Sigma II_j = \Sigma J_j \cdot I_j$ |
| III | ASTIGMATISM (As) | $III = \Sigma III_j = \Sigma J_j \cdot II_j$ |
| IV | SAGITTAL IMAGE PLANE CURVE | $IV = \Sigma IV_j = \Sigma(III_j + P_j)$ |
| V | DISTORTION (Dist) | $V = \Sigma V_j = \Sigma(J_j \cdot IV_j) = \Sigma J_j(III_j + P_j)$ |
| P | Petzval IMAGE PLANE CURVE | $P = \Sigma P_j = -\Sigma(1/r_j) \cdot \Delta(1/n_j)$ |

FIG. 25A
FIG. 25B
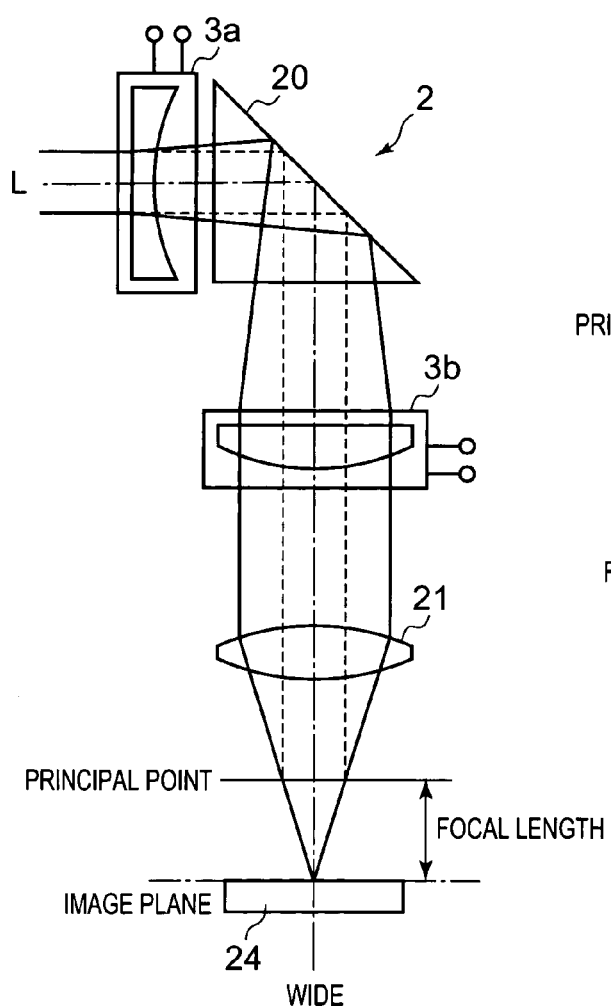
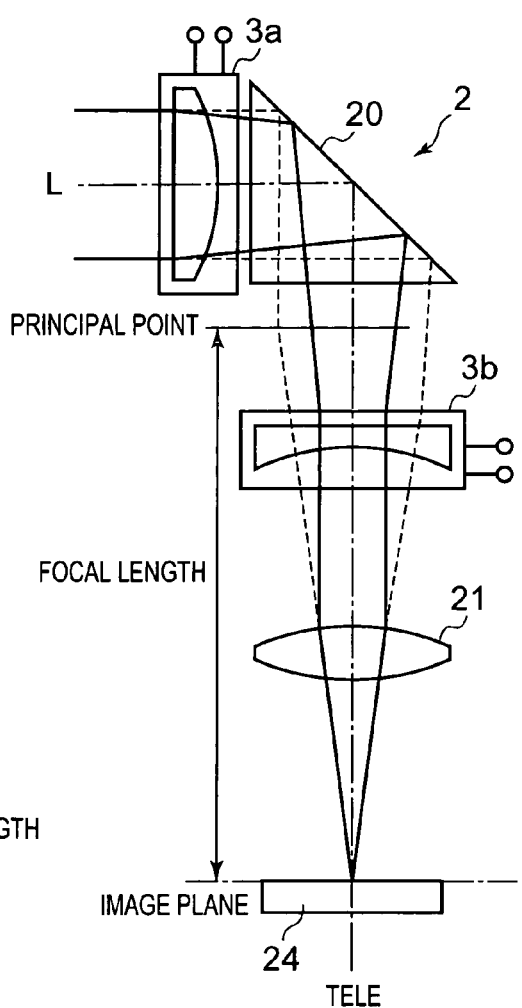

FIG. 27A

| NO. | RADIUS OF CURVATURE R | INTER-SURFACE DISTANCE d | REFRACTIVE INDEX nd | ABBE NUMBER $\nu d$ | GLASS/LIQUID NAMES |
|---|---|---|---|---|---|
| OBJECT POINT SURFACE | FLAT | INFINITY | 1 | | AIR |
| R1 | FLAT($\infty$) | 0.5 | 1.4918 | 57.45 | PMMA |
| R2 | FLAT | VARIABLE(d2) | 1.515 | 45.98 | IMMERSION OIL |
| R3 | VARIABLE (LIQUID INTERFACE) | VARIABLE(d3) | 1.334 | 48.41 | WATER |
| R4 | FLAT | 0.5 | 1.4918 | 57.45 | PMMA |
| R5 | FLAT | 20 | 1 | | AIR |
| R6 | FLAT (DIAPHRAGM) | 21.21 | 1 | | AIR |
| R7 | FLAT | 0.5 | 1.4918 | 57.45 | PMMA |
| R8 | FLAT | VARIABLE(d8) | 1.515 | 45.98 | IMMERSION OIL |
| R9 | VARIABLE (LIQUID INTERFACE) | VARIABLE(d9) | 1.334 | 48.41 | WATER |
| R10 | FLAT | 0.5 | 1.4918 | 57.45 | PMMA |
| R11 | FLAT | 4 | 1 | | AIR |
| R12 | 26.638 | 3.37 | 1.6689 | 44.98 | BaF13 |
| R13 | 118.455 | 0.13 | 1 | | AIR |
| R14 | 13.039 | 3.83 | 1.6228 | 56.93 | SK10 |
| R15 | 32.821 | 3.76 | 1.4645 | 65.7 | FK3 |
| R16 | -63.637 | 3 | 1.7552 | 27.58 | SF4 |
| R17 | 7.574 | 2.34 | 1 | | AIR |
| R18 | FLAT (DIAPHRAGM) | 3.18 | 1 | | AIR |
| R19 | 12.32 | 3 | 1.7018 | 41.02 | BaSF52 |
| R20 | -63.828 | | 1 | | AIR |
| FOCAL PLANE | FLAT | | | | |

FIG. 27B

| MAGNIFICATION m | CURVATURE OF LIQUID INTERFACE | | LIQUID SURFACE POSITION | | | | FOCAL LENGTH f | Bf | APERTURE RATIO F |
|---|---|---|---|---|---|---|---|---|---|
| | R3 | R9 | d2 | d3 | d8 | d9 | | | |
| 0.4 | 6.033 | -15.08 | 2.6 | 6.4 | 6 | 3 | 9.95 | 10.26 | 1.43 |
| 0.6 | 13.575 | -22.62 | 2.9 | 6.1 | 5.2 | 3.8 | 15.06 | 10.32 | 1.38 |
| 0.8 | 36.2 | -45.25 | 4.1 | 4.9 | 5.1 | 3.9 | 20.16 | 10.33 | 1.35 |
| 1 | FLAT | FLAT | 4.5 | 4.5 | 4.5 | 4.5 | 25.08 | 10.32 | 1.35 |
| 1.5 | -27.15 | 18.1 | 5.5 | 3.5 | 3.2 | 5.8 | 36.45 | 10.52 | 1.46 |
| 2 | -18.1 | 9.05 | 5.8 | 3.2 | 2 | 7 | 46.4 | 11.34 | 1.86 |
| ... | | | | | | | | | |

9.0    9.0

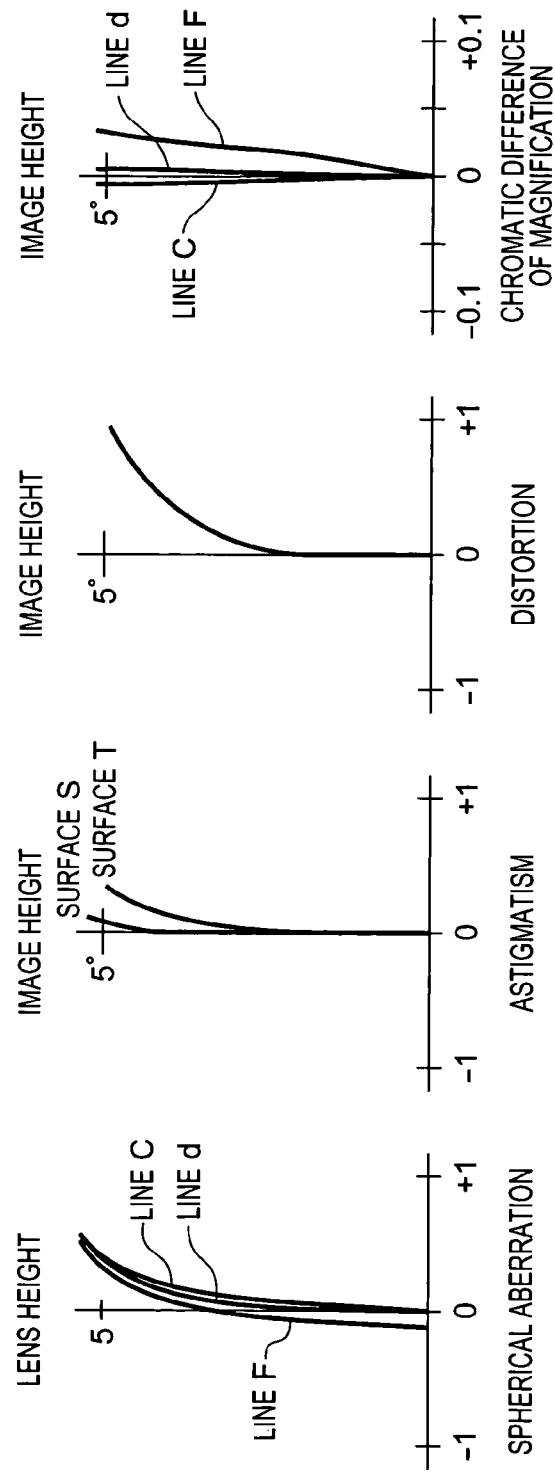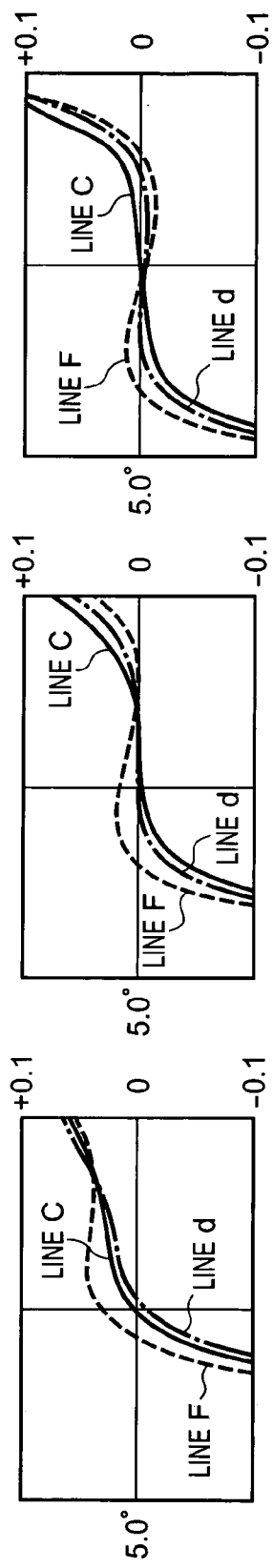

FIG. 28

| SURFACE j | SPHERICAL ABERRATION (I) | COMA ABERRATION (II) | ASTIGMATISM (III) | SAGITTAL IMAGE PLANE CURVE (IV) | DISTORTION (V) | PETZVAL SUM (P) | CHROMATIC ABERRATION | CHROMATIC DIFFERENCE OF MAGNIFICATION |
|---|---|---|---|---|---|---|---|---|
| 1 | 0 | 0 | 0 | 0 | 0.551 | 0 | 0 | -0.00172 |
| 2 | 0 | 0 | 0 | 0 | 0.0137 | 0 | 0 | -0.000396 |
| 3 | -0.319 | -0.237 | -0.177 | -0.276 | -0.205 | -0.0994 | -0.000104 | -0.0000772 |
| 4 | 0.000968 | 0.00496 | 0.0254 | 0.0254 | 0.131 | 0 | 0.0000976 | 0.0005 |
| 5 | -0.00475 | -0.0244 | -0.125 | -0.125 | -0.641 | 0 | 0.000367 | 0.00188 |
| 6 | 0 | 0 | 0 | 0 | 0 | 0 | 0 | 0 |
| 7 | 0.00721 | 0.0369 | 0.189 | 0.189 | 0.189 | 0 | -0.000557 | -0.00285 |
| 8 | 0.00018 | 0.000921 | 0.00472 | 0.00472 | 0.0242 | 0 | -0.000129 | -0.000661 |
| 9 | 0.318 | 0.551 | 0.955 | 1.01 | 1.76 | 0.0596 | 0.000152 | 0.000263 |
| 10 | 1.17e-12 | 3.82e-9 | 0.0000125 | 0.0000125 | 0.0407 | 0 | 0.00000014 | 0.000458 |
| 11 | -5.72e-12 | -1.87e-8 | -0.000061 | -0.000061 | -0.199 | 0 | 5.26e-7 | 0.00172 |
| 12 | 0.422 | 1.25 | 3.67 | 3.92 | 11.5 | 0.245 | -0.00449 | -0.0132 |
| 13 | 0.0573 | 0.0331 | 0.0191 | -0.0319 | -0.0184 | -0.051 | -0.00145 | -0.000835 |
| 14 | 0.225 | 0.656 | 1.91 | 2.36 | 6.87 | 0.443 | -0.00405 | -0.0118 |
| 15 | 0.065 | 0.0911 | 0.128 | 0.0969 | 0.136 | -0.0306 | -0.000506 | -0.000709 |
| 16 | -0.965 | -2.04 | -4.33 | -4.36 | -9.23 | -0.0268 | 0.00606 | 0.0128 |
| 17 | -0.557 | -1.95 | -6.84 | -7.69 | -27 | -0.856 | 0.0059 | 0.0207 |
| 18 | 0 | 0 | 0 | 0 | 0 | 0 | 0 | 0 |
| 19 | 0.0436 | 0.216 | 1.07 | 1.58 | 7.8 | 0.504 | -0.00178 | -0.00882 |
| 20 | 0.642 | 1.44 | 3.22 | 3.31 | 7.41 | 0.0973 | -0.00238 | -0.00532 |
| TOTAL | -0.0645 | 0.0286 | -0.2808 | 0.0131 | -0.0848 | 0.2851 | -0.00287 | -0.00807 |

FIG. 31A
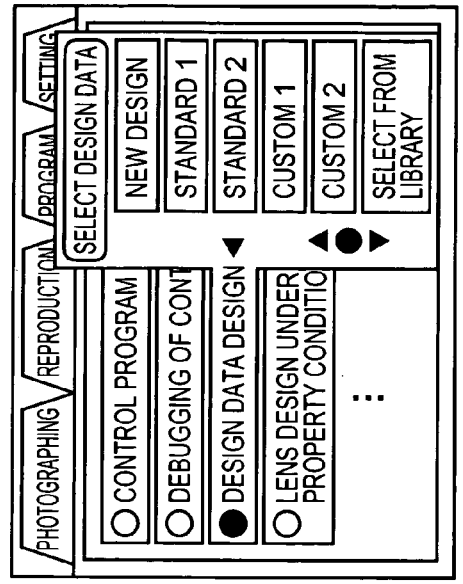
FIG. 31B
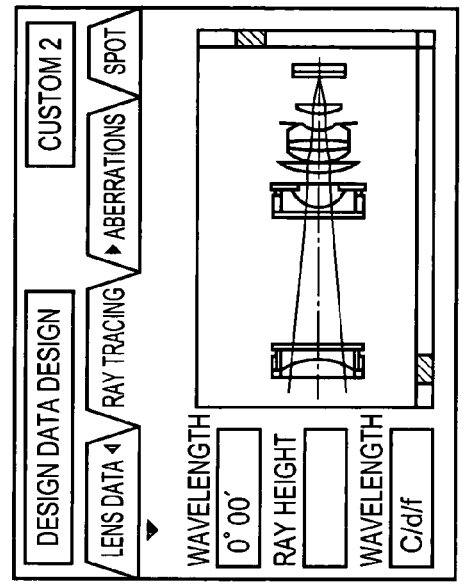
FIG. 31C
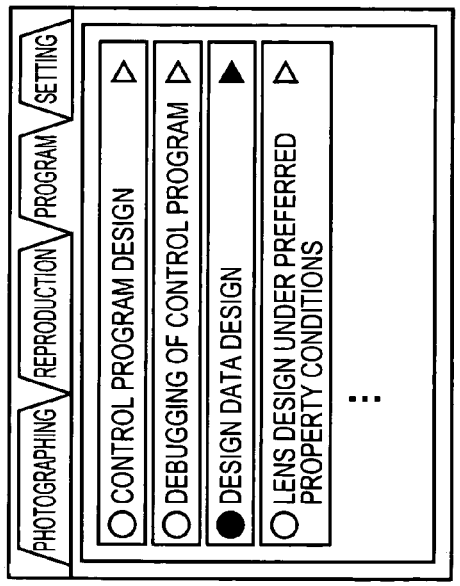
FIG. 31D

CAMERA WHICH INCORPORATES A LENS UNIT THAT CAN PROGRAM AN OPTICAL PROPERTY COMPRISING A SELECTION UNIT

BACKGROUND OF THE INVENTION

The present invention relates to an optical unit including a plurality of lenses and a camera and optical equipment which incorporate the optical unit.

Conventionally, an optical unit of optical equipment such as a camera includes a plurality of lenses, and the focal length and magnification can be adjusted by exchanging and moving part of the lenses. When lenses are exchanged, however, manhours are required for exchanging lenses, and there exists a risk that dust enters the interior of a camera when lenses are exchanged. In addition, when the lenses are moved, since the shapes of the lenses themselves do not change, there is imposed a limitation on the range of adjustment.

Incidentally, in recent years, optical units have been developed which incorporate lenses in which an optical property such as focal length can be adjusted or so-called variable property lenses. According to these optical units, it is considered that the optical properties of the whole optical unit can be adjusted over a wide range by adjusting the optical properties of the variable property lenses.

However, even in the event that the optical properties of the lenses can be changed, expert knowledge and a plenty of experience is required in order to design an optical unit by combining the optical properties of the respective lenses. Due to this, it is difficult for ordinary users to adjust the optical properties of the optical unit to their own preferences.

A problem that the invention is to solve is to provide an optical unit, a camera and optical equipment which can facilitate the acquiring of a desired optical property.

SUMMARY OF THE INVENTION

According to an aspect of the invention, there is provided a camera which incorporates a lens unit which can program an optical property, comprising:

a plurality of optical elements which are disposed on an optical axis of the lens unit;

an electronic control unit for changing an optical property of the whole lens unit by changing the state of the plurality of optical elements within the lens unit through electronic control;

a storage unit for storing control information for controlling the state of the plurality of optical elements so that a predetermined optical property of the whole lens unit falls within a predetermined range of a whole range that can be changed by the electronic control unit;

a selection unit for selecting one of the control information stored in the storage unit as control information for controlling the state of the plurality of optical elements at the time of photographing; and a photographing control unit for controlling the state of the plurality of optical elements that is changed by the electronic control unit based on the control information selected by the selection unit at the time of photographing.

In addition, according to another aspect of the invention, there is provided a lens unit which can program an optical property, comprising:

a detachable unit adapted to be detached from a camera;

a plurality of optical elements disposed on an optical axis of the lens unit;

an electronic control unit for changing an optical property of the whole lens unit by changing the state of the plurality of lens elements within the lens unit through electronic control;

an obtaining unit for obtaining control information for controlling the state of the plurality of optical elements so that a predetermined optical property of the whole lens unit falls within a predetermined range of a whole range that can be changed by the electronic control unit;

a photographing control unit for controlling the state of the plurality of optical elements that is changed by the electronic control unit based on the control information obtained by the obtaining unit at the time of photographing.

Additionally, according to a further aspect of the invention, there is provided a method for controlling a camera incorporating an electronic control unit for changing the state of a plurality of optical elements disposed on an optical axis of a lens unit through electronic control to thereby change an optical property with respect to an optical path of the whole lens unit, comprising the steps of:

setting an operation mode of the camera to a design mode;

preparing control information for controlling the state of the plurality of optical instruments so that a predetermined optical property of the whole lens unit falls within a predetermined range of a whole range that can be changed by the electronic control unit;

setting the operation mode of the camera to a setting mode;

selecting one of the prepared control information as control information that is to be used for control at the time of photographing in such a state that the setting mode is set; setting the operation mode of the camera to a photographing mode; and controlling the state of the plurality of optical elements that is changed by the electronic control unit based on the selected control information so that the optical property with respect to an optical path of the whole lens unit falls within part of the whole range that can be changed by the electronic control unit.

BRIEF DESCRIPTION OF THE DRAWINGS

Then, FIG. 4 shows

In addition.

Furthermore, FIGS. 10, 12 and 13 are flowcharts showing the operation of the camera according to the invention.

In addition.

Then.

In addition.

Then.

Furthermore, FIGS. 25A to 25B and 26 show diagrams showing other embodiments of zoom lens units, FIGS. 27A, 27B are design data of the zoom lens unit shown in FIG. 26, FIG. 27C shows vertical aberrations, FIG. 27D shows lateral aberrations, and FIG. 28 is a table showing aberrations when the design data shown in FIGS. 27A, 27B are used.

Then, FIGS. 31A to 31H show operation guides displayed at the display unit.

DESCRIPTION OF THE PREFERRED EMBODIMENTS OF THE INVENTION

Hereinafter, embodiments of the invention will be described based on the drawings.

Figure 1A:
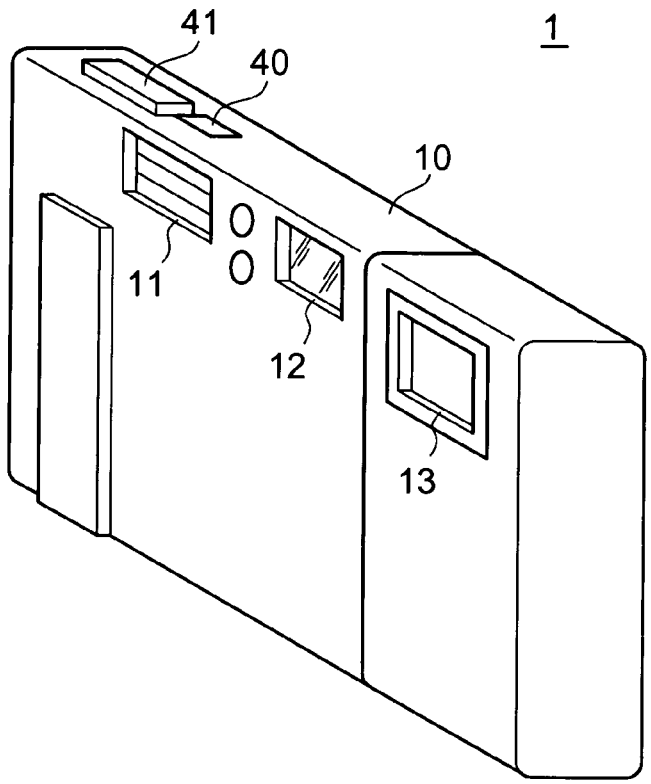
FIGS. 1A and 1B are external views of a camera according to the invention.

FIG. 1A is an external view of a camera 1 according to the invention.

Figure 2:
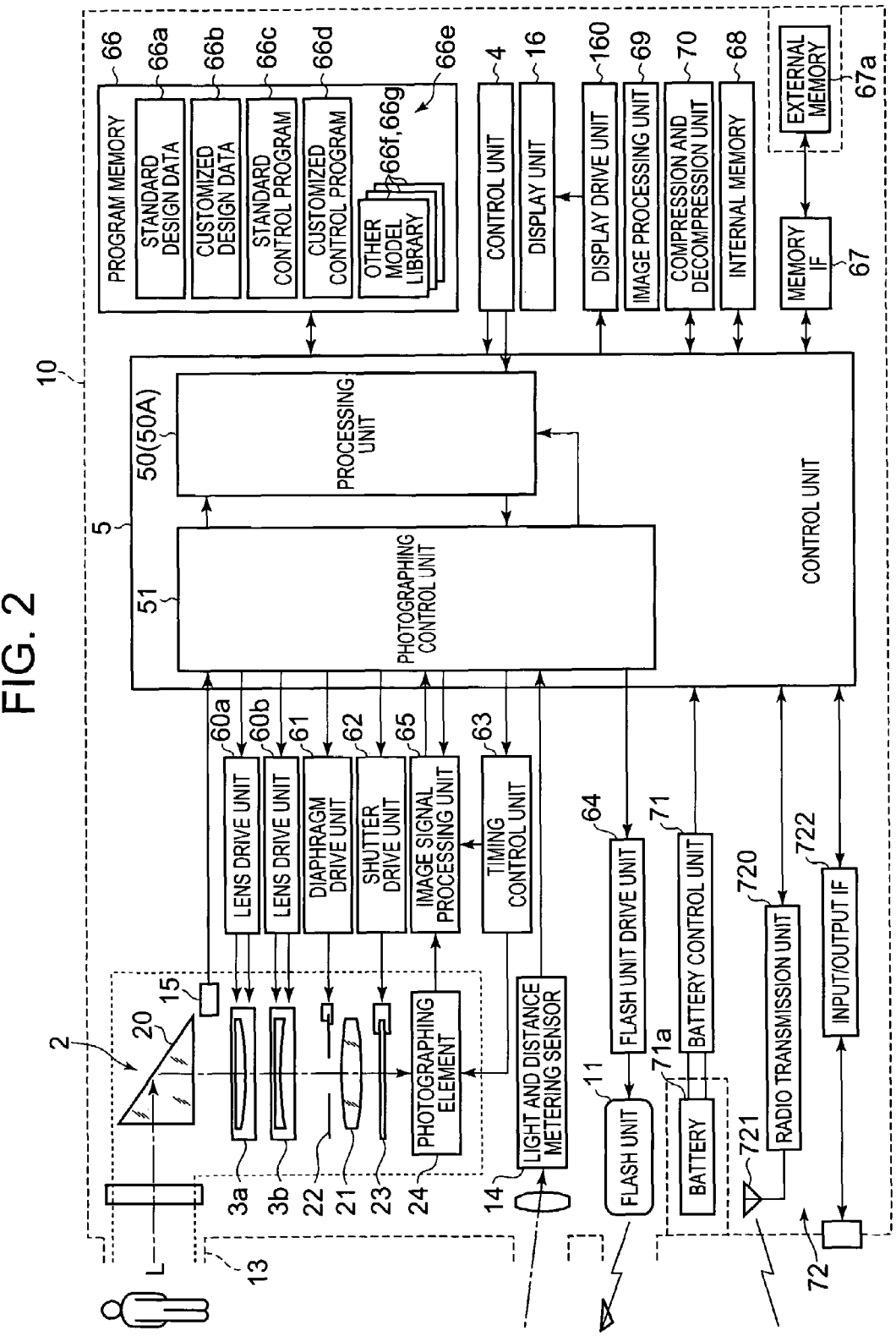
FIG. 2 is a block diagram of the camera according to the invention.

As shown in the figure, the camera 1 is a so-called compact camera and includes a strobe or flash unit 11, a viewfinder eyepiece 12, a photographing light intake window 13 and a light and distance metering sensor 14 which are placed on a front side of a casing 10 (refer to FIG. 2).

The flash unit 11 is such as to emit a flash light to a subject. A conventionally known flash unit is used as this flash unit 11. The viewfinder eye piece 12 is a window used by the user of the camera for confirming a photographing range and is provided in parallel with the photographing light intake window 13. The photographing light intake window 13 is a window for taking in light from the subject into the interior of the casing 10. As shown in FIG. 2, a temperature sensor 15 and a zoom lens unit 2, which is an optical unit according to the invention, are provided further inward of the casing 10 in such a manner as to be situated close to each other.

The temperature sensor 15 is such as to measure the temperature in the interior of the casing 10 and more particularly the temperature in the vicinity of the zoom lens unit 2.

The zoom lens unit 2 includes a prism 20, variable-focal-length lenses 3a, 3b and a rigid lens 21 as a group of optical elements in the invention. These optical elements are arranged vertically in this order along an optical axis L.

The prism 20 is such as refract light that has entered from the photographing light intake window 13 so as to cause the light so refracted to be incident on the variable-focal-length lens 3a therebelow.

Figure 3A:
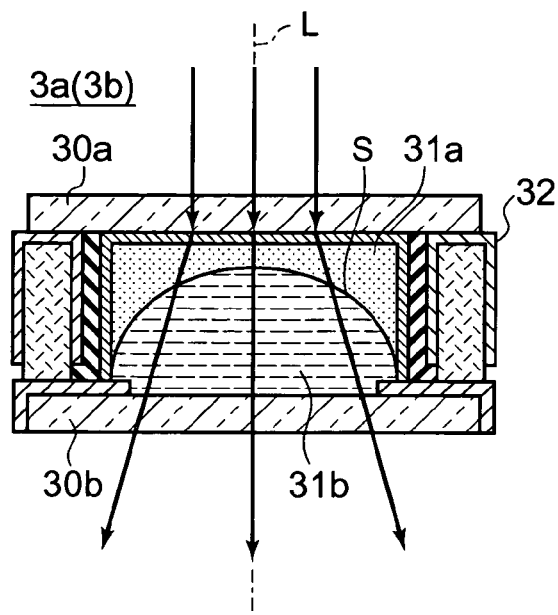
FIGS. 3A to 3C are sectional views of a variable-focal-length lens.
Figure 3B:
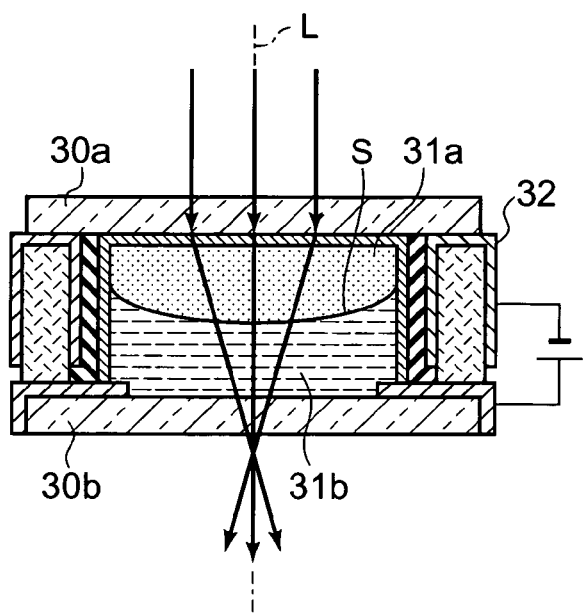
Figure 3C:
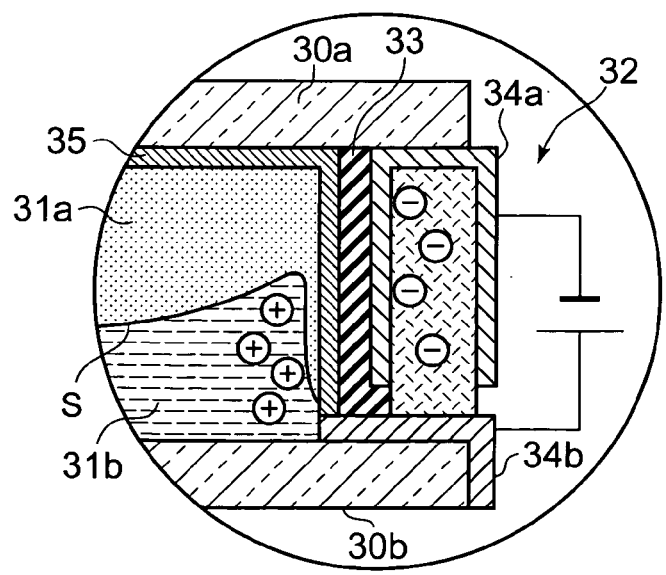
Figure 4A:
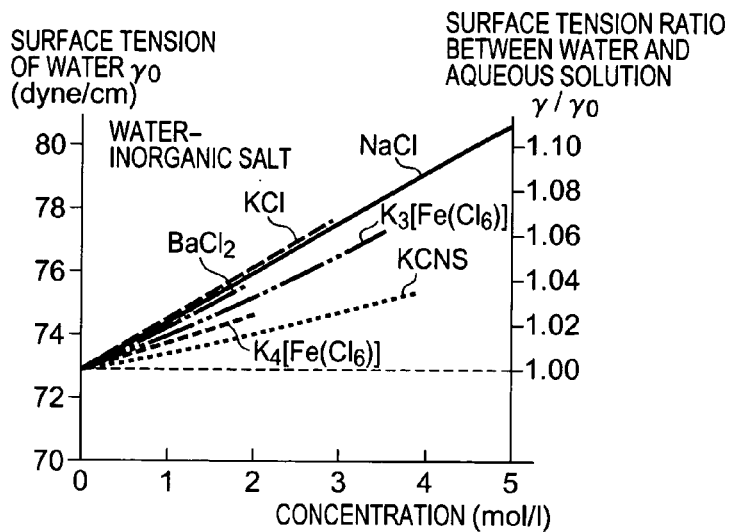
FIGS. 4A to 4D show relationships between the concentrations of aqueous solutions and surface tension.
Figure 4B:
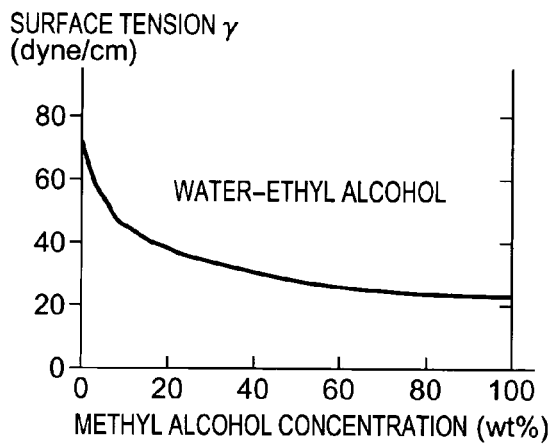
Figure 4C:
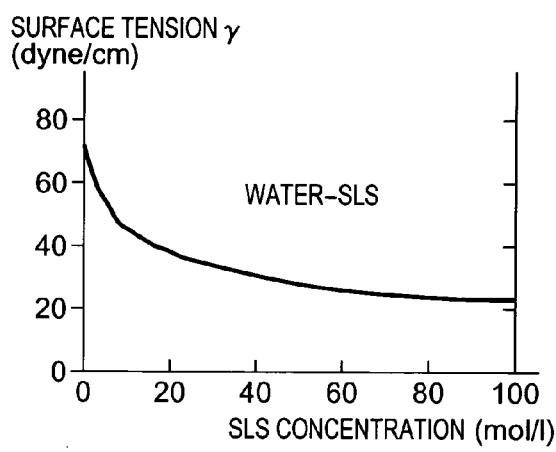
Figure 4D:
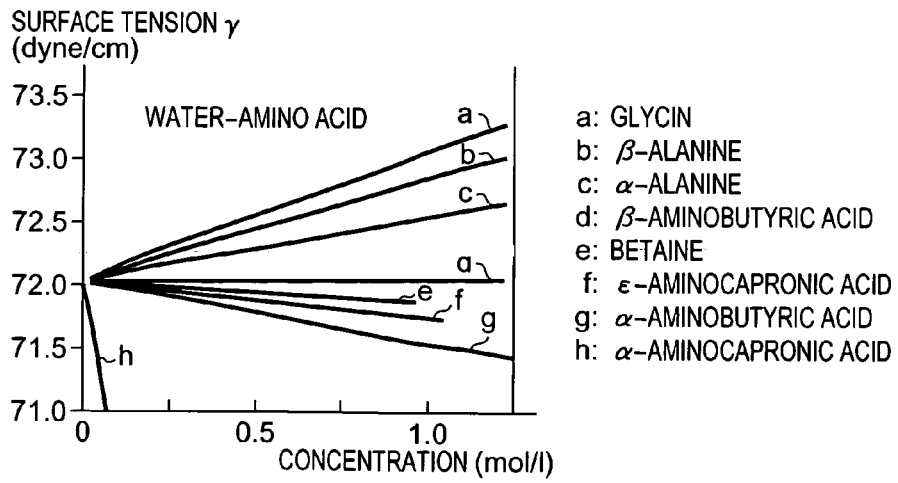

The variable-focal-length lenses 3a, 3b are variable-focal-length optical elements in the invention and are fixedly provided on the optical axis in a horizontal state. As shown in FIGS. 3A to 3C, these variable-focal-length lenses 3a, 3b each include two transparent plates 30a, 3b.

The transparent plates 30a, 30b are discs or circular plates made from acrylic resin and polycarbonate resin, and the transparent plate 30a is provided in such a manner as to be situated direct above the transparent plate 30b. Here, when these transparent lenses 30a, 30b are regarded as lenses, their focal lengths $f_{Ta}$, $f_{Tb}$ are expressed by the following equations (1), (2).

$$1/f_{Ta} = (n_{Ta}-1)(1/R_{Ta1}-1/R_{Ta2})+(n_{Ta}-1)^2 \cdot dL_{Ta}/(n_{Ta} \cdot R_{Ta1} \cdot R_{Ta2}) \quad (1)$$

$$1/f_{Tb} = (n_{Tb}-1)(1/R_{Tb1}-1/R_{Tb2})+(n_{Tb}-1)^2 \cdot dL_{Tb}/(n_{Tb} \cdot R_{Tb1} \cdot R_{Tb2}) \quad (2)$$

where, in Equation (1), "$R_{Ta1}$", "$R_{Ta2}$" are radii of curvatures of upper and lower surfaces of the transparent plate 30a, "$n_{Ta}$" is a refractive index of the transparent plate 30a, and "$dL_{Ta}$" is the thickness of the transparent plate 30a. Similarly, in Equation (2), "$R_{Tb1}$", "$R_{Tb2}$" are radii of curvatures of upper and lower surfaces of the transparent plate 30b, "$n_{Tb}$" is a refractive index of the transparent plate 30b, and "$dL_{Tb}$" is the thickness of the transparent plate 30b.

Two types of liquids 31a, 31b are interposed between the transparent plates 30a, 30b as fluids of the invention.

These liquids 31a, 31b are not mixed with each other but are separated vertically in this order and they have different refractive indices. Due to this, an optical surface S is formed between these liquids 31a, 31b by an interface between these two fluids.

In addition, one of the liquids 31a, 31b is a non-conductive liquid and the other is a conductive liquid.

For example, liquids shown in the following table 1 can be used as these liquids 31a, 31b. As combinations of the liquids 31a, 31b, for example, there are a combination in which silicone oil is used as the liquid 31a and an aqueous solution is used as the liquid 31b, a combination in which an immersion oil is used as the liquid 31a and a glycol system antifreeze is used as the liquid 31b, a combination in which a fluorine system inactive liquid is used as the liquid 31a and an aqueous solution is used as the liquid 31b and the like. Here, the liquids 31a, 31b are preferably prepared so as to have substantially the same specific gravity from the viewpoint of reducing the deformation of the optical surface S due to gravity and posture. In the embodiments of the invention, an immersion oil or a dimethyl silicone oil is used as the liquid 31a and an aqueous solution is used as the liquid 31b.

TABLE 1

| Designation of Liquids | Surface tension γ dym/cm(20° C.) | Viscosity (Coefficient of Viscosity) η cP(25° C.) | Specific gravity | Relative dielectric constant K ε (20° C.) | Refractive index nD (20° C.) |
|---|---|---|---|---|---|
| 1 Water (Aqueous solution) | 72.8 | 0.89 | 1.00 | 80.4 | 1.333 |
| 2 Aniline | 42.0 | 3.82 | 1.02 | 6.9 | 1.586 |
| 3 Aceton | 21.0 | 0.31 | 0.79 | 20.7 | 1.362 |

TABLE 1-continued

| Designation of Liquids | Surface tension γ dym/cm(20° C.) | Viscosity (Coefficient of Viscosity) η cP(25° C.) | Specific gravity | Relative dielectric constant K ε (20° C.) | Refractive index nD (20° C.) |
|---|---|---|---|---|---|
| 4 Ethyl alcohol | 22.3 | 1.08 | 0.79 | 24.3 | 1.362 |
| 5 Glycerin | 63.4 | 1069 | 1.26 | 42.5 | 1.473 |
| 6 Diethyl ether | 17.0 | 0.22 | 0.72 | 4.3 | 1.354 |
| 7 Carbon tetrachloride | 27.6 | 0.91 | 1.59 | 2.2 | 1.461 |
| 8 Methylene iodide (diiodomethane) | 50.8 | | 3.32 | | 1.737 |
| 9 Cedar wood oil | | | 0.95 | 2.5 | 1.516 |
| 10 Castor oil | | 700 | 0.96 | 2.2 | 1.478 |
| 11 Paraffin oil | 26.4 | | 0.85 | 2.2 | 1.480 |
| 12 Benzene | 28.9 | 0.60 | 0.88 | 2.3 | 1.501 |
| 13 Methyl alchohol | 22.6 | 0.54 | 0.79 | 32.6 | 1.329 |
| 14 Ethylene glycol (Anti-freeze) | 48.4 | 4.23 | 1.12 | 38.7 | 1.431 |
| 15 Fluorine system inactive liquid (Fluorinert, FC | 13 | 0.55 | 1.73 | 1.8 | 1.261 |
| 16 Dimethyl silicone oil | 21.2 | 10–10000 | 0.97 | 2.2 | 1.403 |
| 17 Methylphenyl silicon oil | 25.2 | 400 | 1.07 | 2.2 | 1.505 |
| 18 Methyl hydrogen silicone oil | 20.0 | 20 | 1.00 | 2.2 | 1.395 |
| 19 Immersion oil (Type A) | | 150 | 0.92 | | 1.515 |
| 20 Immersion oil (Type NVH) | | 21000 | 0.91 | | 1.515 |

Note that in Table 1, the "Fluorinert" is a trade name of a product by the 3M Inc.

TABLE 2

| | Refractive index n(C) 656.3 nm | Refractive index n(d) 587.6 nm | Refractive index n(e) 546.1 nm | Refractive index n(F) 486.1 nm | nF − nC | Abbe numbers ν d |
|---|---|---|---|---|---|---|
| Immersion oil (Type A) | 1.5115 | 1.5150 | 1.5180 | 1.5239 | 0.0124 | 41.53 |
| Immersion oil (Type B) | 1.5115 | 1.5150 | 1.5180 | 1.5236 | 0.0121 | 42.56 |
| Immersion oil (Type NVH) | 1.5118 | 1.5150 | 1.5178 | 1.5230 | 0.0112 | 45.98 |
| Immersion oil (Type OVH) | 1.5118 | 1.5150 | 1.5178 | 1.5230 | 0.0112 | 45.98 |
| Immersion oil (Type DF) | 1.5118 | 1.5150 | 1.5180 | 1.5234 | 0.0116 | 44.40 |
| Immersion oil (Type FF) | 1.4766 | 1.4790 | 1.4810 | 1.4850 | 0.0084 | 57.02 |
| Optic glass (BK7) | 1.5139 | 1.5163 | 1.5183 | 1.5219 | 0.0081 | 64.14 |
| Optic glass (F2) | 1.6150 | 1.6200 | 1.6241 | 1.6321 | 0.0171 | 36.26 |
| Vitreous silica | 1.4560 | 1.4580 | 1.4600 | 1.4630 | 0.0070 | 65.43 |
| PMMA (Acryl) | 1.4892 | 1.4918 | 1.4978 | 1.4978 | 0.0086 | 57.45 |
| PC (Polycarbonate) | 1.579 | 1.584 | 1.5886 | 1.5965 | 0.0175 | 33.37 |
| Water | 1.3311 | 1.3340 | 1.3345 | 1.3380 | 0.0069 | 48.41 |

In addition, in Table 1, a solute for the aqueous solution may be inorganic or organic. As inorganic matters to be solved, there are raised inorganic chlorides such as potassium chloride (kcl), sodium chloride (NaCl), barium chloride ($BaCl_2$), potassium hexacyaoferrate (III) ($K_3[Fe(Cl_6)]$), potassium hexacyanoferrate (II) ($K_4[Fe(Cl_6)]$), potassium thiocyanate (KCNS). In addition, as organic matters to be solved, there are raised, for example, alcohols, amino acids, various types of surface-tension modifiers and the like. Here, as shown in FIGS. 4A to 4D, the surface tension (interfacial tension) of the aqueous solution varies according to concentrations. Due to this, the concentration of the aqueous solution is preferably set so that the radius of curvature of the optical surface S falls within a predetermined range.

Furthermore, in Table 1, as the immersion oils, immersion oils shown in the following table 2 may be used in place of the "Type A" and "Type B", and furthermore, an immersion oil combined with an immersion oil for an oil immersion microscope may be used. Here, the "Type A" oil is a low viscosity synthetic oil for short focus observation in which terphenyl, terphenyl hydride, polybutane, hydrocarbon and the like are mixed together, the "Type B" oil is an intermediate viscosity synthetic oil for lenses for medical equipment, and the "Type NVH" and "Type OVH" oils are high viscosity synthetic oils for long distance observation.

Note that in Table 2 above, in addition to optical properties of the immersion oils, optical properties of the optical glass "BK7" (trade name) by Schott Glas Inc are also shown.

Here, when these liquids 31a, 31b are regarded as lenses, their focal lengths $f_{Ea}$, $f_{Eb}$ are expressed by the following equations (3), (4).

$$1/f_{Ea} = (n_{Ea}-1)(1/R_{Ea1} - 1/R_{Ea2}) + (n_{Ea}-1)^2 \cdot dL_{Ea}/(n_{Ea} \cdot R_{Ea1} \cdot R_{Ea2}) \quad (3)$$

$$1/f_{Eb} = (n_{Eb}-1)(1/R_{Eb1} - 1/R_{Eb2}) + (n_{Eb}-1)^2 \cdot dL_{Eb}/(n_{Eb} \cdot R_{Eb1} \cdot R_{Eb2}) \quad (4)$$

where, in Equation (3), "$R_{Ea1}$", "$R_{Ea2}$" denote radii of curvatures of upper and lower surfaces of the liquid 31a, "$n_{Ea}$" denotes the refractive index of the liquid 31a, and "$d_{LEa}$" denotes the thickness of the liquid 31a on the optical axis. Similarly, in Equation 4, "$R_{Eb1}$", "$R_{Eb2}$" denote radii of curvatures of upper and lower surfaces of the liquid 31b, "$n_{Eb}$" denotes the refractive index of the liquid 31b, and "$d_{LEb}$" denotes the thickness of the liquid 31b on the optical axis.

Note that assuming that the radii of the liquids 31a, 31b is "r" and the height thereof is "h", the contact angle θ and the radii R of the liquids 31a, 31b can be obtained as shown by the following Equations (5), (6).

$$\theta = 2\tan^{-1}(h/r) \quad (5)$$

$$R = r/\sin\theta \quad (6)$$

An annular electrode portion 32 is provided on an outside of the liquids 31a, 31b.

This electrode portion 32 includes, as shown in FIG. 3C, an insulation layer 33 and electrodes 34a, 34b and seals in the liquids 31a, 31b together with the transparent plates 30a, 30b.

The insulation layer 33 has a nature that conducts no electricity, surrounds the liquids 31a, 31b from the side thereof and is inter posed between the electrode 34a and the electrode 34b at an outer circumferential portion. A water repulsive layer 35 is provided on an inner circumferential surface of the insulation layer 33 and a lower surface of the transparent plate 30a and produces such a state that the liquid 31a is surrounded by the liquid 31b and the water repulsive layer 35.

The water repulsive layer 35 is formed from, for example, any of compounds shown in the following table 3. Here, as shown in the table, the contact angle of the liquid 31a varies depending on compounds. Due to this, the type of a compound is preferably set so that the curvature of the optical surface S falls within a predetermined range.

TABLE 3

| Compounds | Surface orientation group | Critical surface tension γ c(mN/m) | Contact angle θ (°) |
|---|---|---|---|
| Perfluorolauric acid monomolecular film | —CF$_3$ | 6 | — |
| Polytetrafluoroethylene | —CF$_2$— | 18 | 108 |
| Poly, perfluorooctyl ethyl acrylate | —CF$_3$, —CF$_2$— | 10 | 120 |
| Octadecyl amine monomolecular film | —CH$_3$ | 22-24 | 102 |
| Polyethylene | —CH$_2$— | 31 | 94 |
| Paraffin | —CH$_3$, —CH$_2$— | 22 | 108 |
| Polydimethyl siloxane | —CH$_3$ | 24 | 101 |

Note that in place of the compounds shown in Table 3, a layer may be used as the water repulsive layer 35 which is coated with polyethylene terephthalate (PET) and ethylene tetrafluoride ethylene copolymer (ETFE), clear acrylic urethane, clear acrylic melamine, polyvinyl chloride and the like. Alternately, a hydrophobic film of polyethylene terephthalate, polyethylene (PE), polypropylene (PP), polystyrene (PS), polycarbonate (PB) and the like may be used. Furthermore, a film may be used which is formed by applying evenly dimethyl silicone oil or methyl hydrogen silicone oil and thereafter heating the silicone oil so applied. When the heating treatment is applied like this, it is preferable to reduce the heating temperature by using organic acid salts such as dibutyltin dilaurate and iron actuate as a curing catalyst.

In addition, the interface tension of the liquids 31a, 31b may be adjusted using, in place of the water repulsive layer 35, a water soluble resin such as polyvinyl alcohol and a hydrophilic film such as the "SC film" (trade name: produced by KANSAI PAINT Co., Ltd.). Here, the SC film is a film produced by coating a clear hydrophilic layer on a film of polyethylene terephthalate.

The electrodes 34a, 34b are transparent conductive films formed of tin oxide ($SnO_2$), indium oxide ($In_2O_3$), indium-tin oxide (ITO) and the like. These electrodes 34a, 34b are designed to apply voltages to the liquids 31a, 31b via the insulation layer 33 and the water repulsive layer 35 to thereby change the shape of the optical surface S, whereby, as shown in FIGS. 3A, 3B, the focal lengths of the variable-focal-length lenses 3a, 3b are changed as a result.

To be specific, in a state where no voltage is impressed, as shown in FIG. 3A, the optical surface S is curved upwardly from below so as to project at the center thereof by virtue of the interface tension of the liquids 31a, 31b. Here, since the refractive index (about 1.4 to 1.5) of the liquid 31a is greater than the refractive index (about 1.33) of the liquid 31b and the refractive index (about 1.0) of air, when the optical surface S is convex upwardly as is described above, the variable-focal-length lenses 31a, 31b have a negative refracting force as a whole and function as a concave lens. Note that when the refractive index of the liquid 31a is smaller than the refractive index of the liquid 31b, the direction of refracting force of the variable-focal-length lenses 3a, 3b is then reversed. In addition, the interface tension $\gamma_{EaEb}$ between the liquid 31a and the liquid 31b is expressed by the following equation (7) using the interface tension $\gamma_{EbTb}$ between the liquid 31b and the transparent plate 30b, the interface tension $\gamma_{Eatb}$ between the liquid 31a and the transparent plate 30b and the contact angle θ of the liquid 31b.

$$\gamma_{EaTb} = \gamma_{EbTb} + \gamma_{EaEb} \cdot \cos\theta \quad (7)$$

When a voltage is impressed to the electrodes 34a, 34b from this state, as shown in FIG. 3C, an electrical double layer is formed on an interface on an electrode 34a side of the liquid 31b and in the interior of the liquid 31b, and as a result of changes in interface tension and contact angle of the liquids 31a, 31b, the upward swelling of the optical surface S is reduced. Then, the voltage so impressed is increased, the optical surface becomes flat, and furthermore, as shown in FIG. 3B, the optical surface is curved so as to project downwards. Thus, when the direction of swelling of the optical surface is changed from upward to downward, the total refracting force of the variable-focal-length lenses 3a, 3b changes from negative to positive. Namely, the function of the variable-focal-length lenses 3a, 3b changes from the concave lens to a convex lens.

Figure 5A:
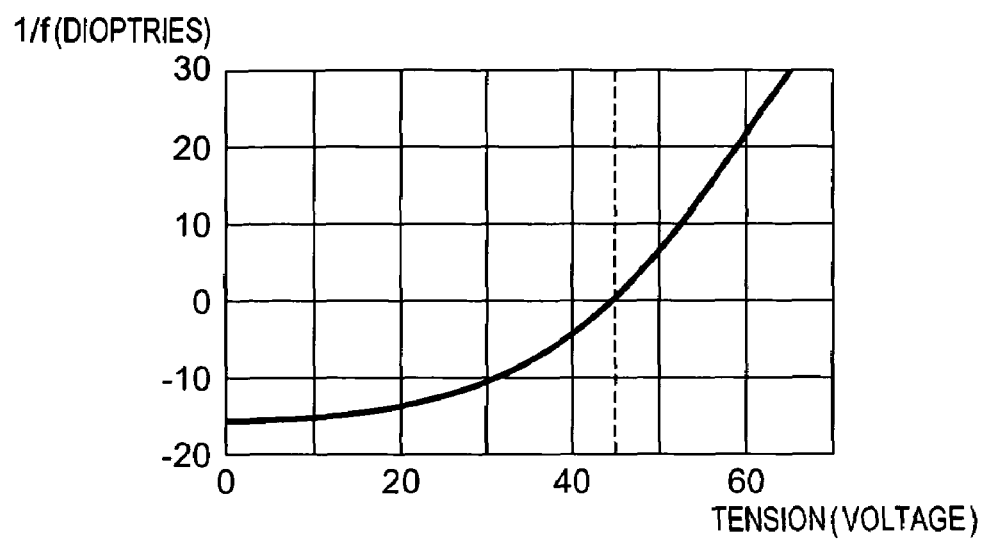
FIG. 5A shows a relationship between impressed voltages impressed to a variable-focal-length lens and curvature diopters.
Figure 5B:
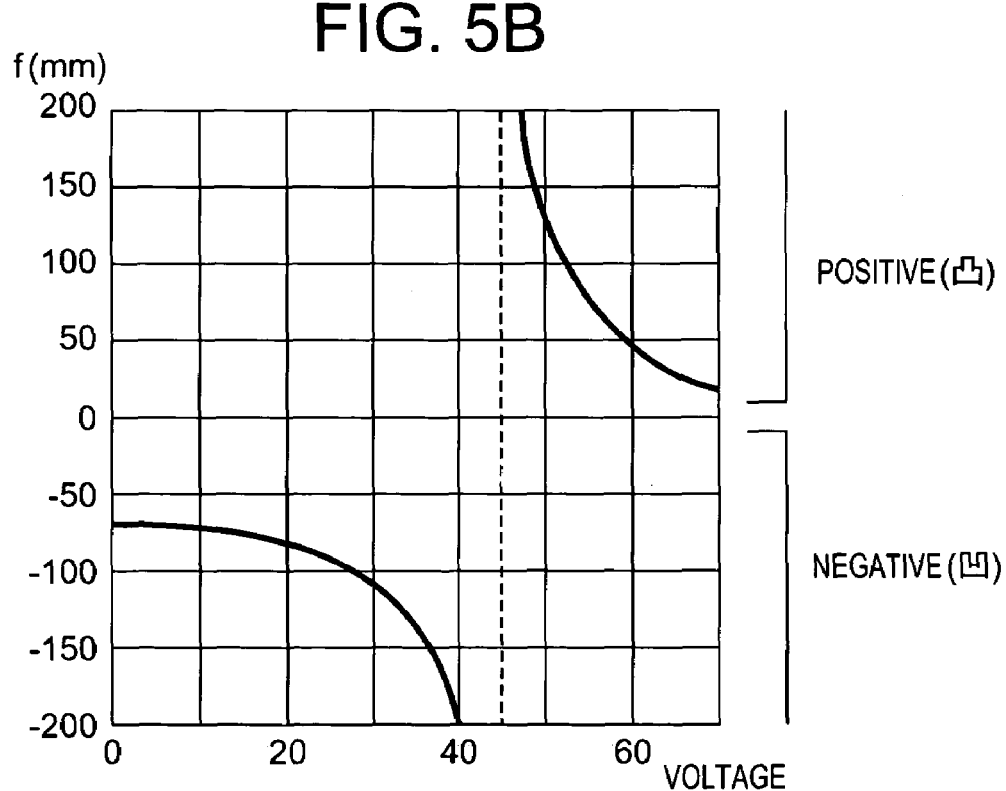
FIG. 5B shows a relationship between impressed voltages and focal lengths.

Here, a relationship between impressed voltages impressed to the variable-focal-length lenses 3a, 3b and curvature diopters (diopter=refractive index of a medium/focal length f) is shown in FIG. 5A, and a relationship between voltages so impressed and focal lengths f is shown in FIG. 5B. As shown in these figures, when there is impressed no voltage or an impressed voltage is small, the variable-focal-length lenses 3a, 3b function as a concave lens having a negative refractive index. On the other hand, an impressed voltage is greater than a predetermined voltage (about 45V in the figure), the variable-focal-length lenses 3a, 3b function as a convex lens having a positive refractive index.

The focal lengths fa, fb of the variable-focal-length lenses 3a, 3b are calculated in a way expressed by the following equations (8), (9).

$$f_a = f_{a1} \times f_{a2}/(f_{a1}+f_{a2}) \quad (8)$$

$$f_b = f_{b1} \times f_{b2}/(f_{b1}+f_{b2}) \quad (9)$$

where, as shown in the following equations (10), (11), $f_{a1}$, $f_{b1}$ denote focal lengths of portions corresponding to the transparent plate 30a and the liquid 31a, respectively, and $f_{a2}$, $f_{b2}$ denote focal lengths of portions corresponding to the transparent plate 30b and the liquid 31b, respectively.

$$f_{a1}, f_{b1} = f_{Ta} \times f_{Ea}/(f_{Ta}+f_{Ea}) \quad (10)$$

$$f_{a2}, f_{b2} = f_{Tb} \times f_{Eb}/(f_{Tb}+f_{Eb}) \quad (11)$$

Figure 6A:
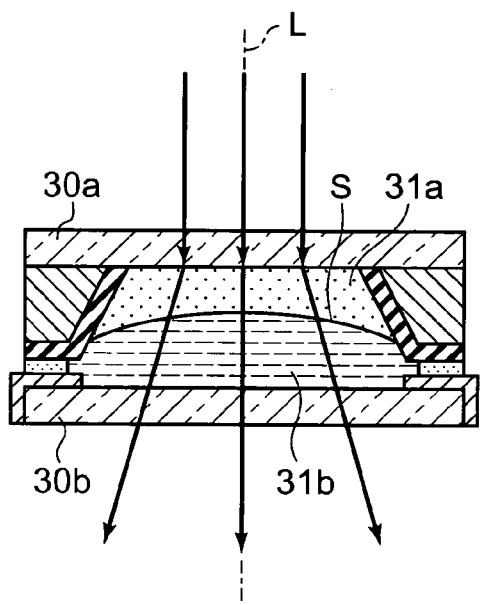
FIGS. 6A to 6C show another form of a variable-focal-length lens.
Figure 6B:
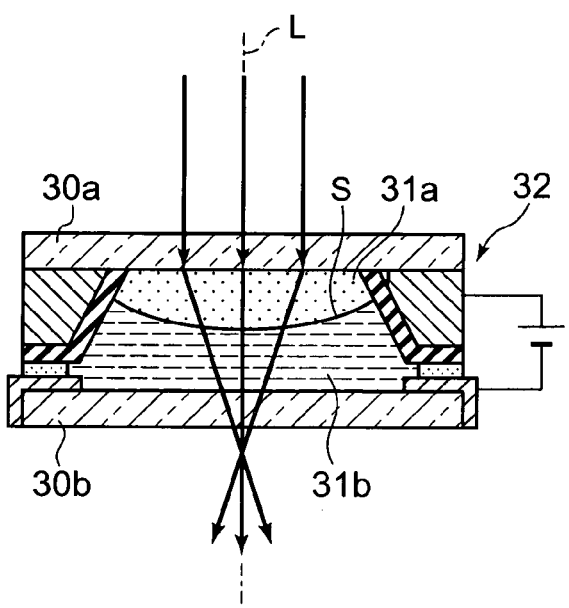
Figure 6C:
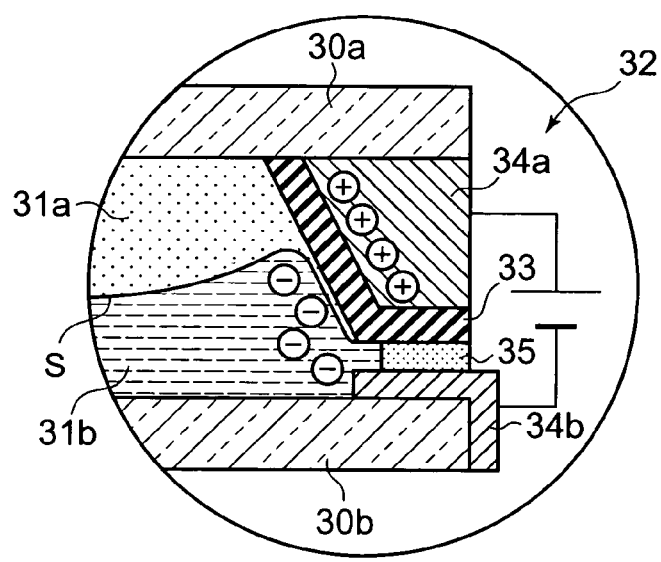

Note that as these variable-focal-length lenses 3a, 3b, while for example, the "Fluid Focus Lens" (trade name of the product by Royal Philips Electronics Inc.) can be used, the "PDN-1000 variable lens unit" (trade name of the product by Varioptics Inc.) shown in FIG. 6 may be used.

In addition, while the variable-focal-length lenses 3a, 3b have been described as changing their focal lengths by interfacial electrostatic phenomenon, the focal lengths may be changed by other principles and phenomena.

To be specific, as disclosed in, for example, Electrocapillarity and wetting of insulator films by water, C. R. Acad. Sci. Paris, t. 317, p. 157 (1993)" and Japanese translation of a PCT application publication No. 2001-519539, the focal lengths may be changed by adjusting the contact angle of a liquid by an electro wetting phenomenon to thereby deform an optical surface. As this occurs, assuming that a contact angle when the application voltage is V is "cos θ (V)" and a contact angle when the application voltage is 0 is "cos θ (0)", a relationship between the application voltage V and the contact angle θ is substantially expressed by the following equation (12) ("Development of positive electrode reaction field evaluation technique in a fused carbonate type fuel cell—Study of wetting mechanism of fused carbonate by impressed voltage—" by Koichi Asano [online], Electric Power Central Research Laboratory (Foundation), [retrieved on Sep. 30, 2004], refer to an internet address <URL:http://ge-rd-info.denken.or.jp/ge_cgi-bin/rep_details.cgi?rep_num=WOOO22&host=>).

$$\cos \theta(V) = \cos \theta(0) + (1/2) \times (Cd/\gamma_{LG}) \times V^2 \quad (12)$$

(where, Cd: electrical double layer capacity [μF/cm²], γLG: surface tension [N/m] between gas phase and liquid phase)

In addition, as is closed in, for example, Japanese translation of a PCT application publication No. 11-513129, Japanese translation of a PCT application publication No. 2001-519539 and Japanese Unexamined Patent Publication No. 2001-13306, the focal lengths may be changed by adjusting the contact angle by making liquid in the vicinity of electrical double layers generated on the interface of the liquid and the interior fluid by electrokinetic phenomenon such as electrophoretic phenomenon or electroosmotic phenomenon to thereby deform an optical surface.

In addition, as is disclosed in U.S. Pat. No. 3,598,479 specification, U.S. Pat. No. 5,138,494 specification, U.S. Pat. No. 5,668,620 specification, Japanese Examined Utility Model Publication No. 40-28614, Japanese Examined Utility Model Publication No. 51-49956, Japanese Unexamined Patent Publication No. 55-36857, Japanese Unexamined Patent Publication No. 6-308303 and Japanese Unexamined Patent Publication No. 2002-311213, a structure in which liquid is filled between dilatant films is used as a variable-focal-length lens, and the focal length thereof may be changed by adjusting the volume and pressure of the liquid to thereby deform the surface of the liquid (an optical surface).

In addition, as is disclosed in, for example, Japanese Unexamined Patent Publication No. 2000-81504, Japanese Patent Publication No. 3400270, Japanese Unexamined Patent Publication No. 2002-311213 and Japanese Unexamined Patent Publication No. 2003-14909, the focal length may be changed by applying an external pressure to an elastic film that closely contacts liquid by means of a piezoelectric device or piezoelectric actuator to thereby deform an optical surface.

Additionally, as is disclosed in "Optical properties and molecular orientations in hybrid orientation liquid crystal electrooptical micro-lens" ("Optics" Vol. 20, No. 4 (April, 1991) and Japanese Patent Publication No. 3158016, the focal length may be changed by changing an oriented state of liquid crystal molecules between transparent substrates by electric field.

In addition, as is disclosed in Japanese Unexamined Patent Publication No. 2002-243918, the focal length may be changed by deforming a transparent substrate that closely contacts the surface of liquid (an optical surface) by electrostatic suction force to thereby deform the optical surface.

Figure 7:
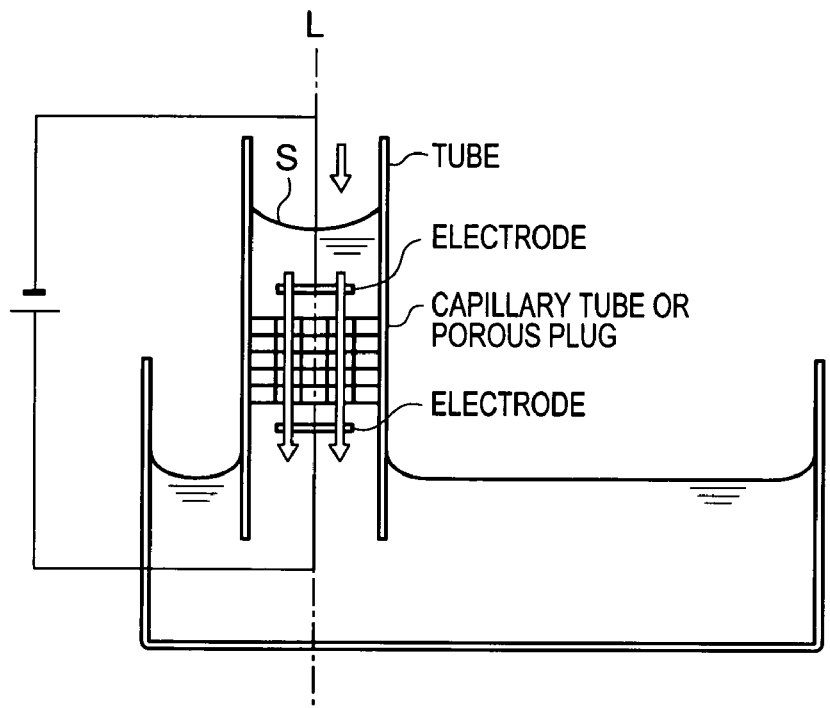
FIGS. 7 to 9 show forms of different variable-focal-length lenses.

Additionally, as shown in FIG. 7, the focal length may be changed by utilizing a liquid in the interior of a tube erected in the liquid as a variable optical device and generating a potential difference (streaming potential) between ends of a capillary tube or porous plug in the tube to thereby change the shape and height of the liquid surface (optical surface) in the tube.

Figure 8:
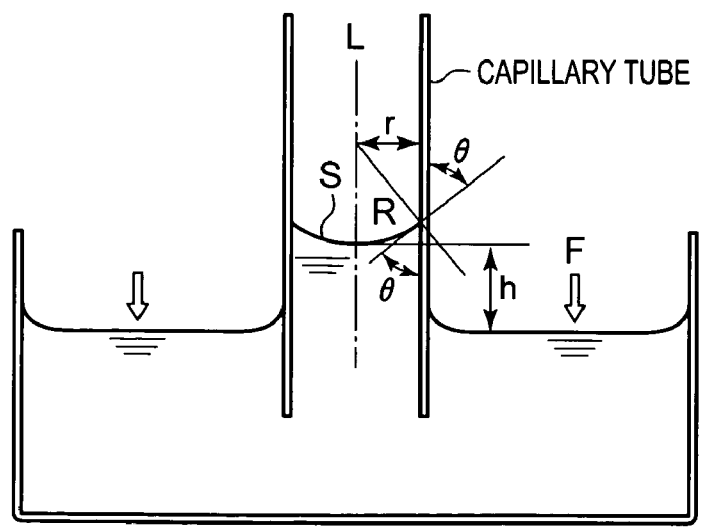

Additionally, as shown in FIG. 8, the focal length may be changed by utilizing a liquid in the interior of a capillary tube erected in a transparent bath as a variable optical device and adjusting a pressure F applied to the liquid surface in the bath to thereby change the shape and height of the liquid surface (optical surface) in the interior of the capillary tube. As this occurs, assuming that the surface tension of the liquid surface is "γ", the pressure variation is "ΔF", the density difference between liquid phase and gas phase is "Δρ", the gravitational acceleration is "g", and the radius of the capillary tube is "r", and the angle θ is set as shown in FIG. 8, the curvature C and height h of the liquid surface in the capillary tube are expressed by the following equations (13), (14).

$$C = 2\gamma/\Delta F (= 2\gamma/\Delta \rho g h) \quad (13)$$

$$h = 2\gamma \cos \theta / \Delta \rho r g \quad (14)$$

Figure 9:
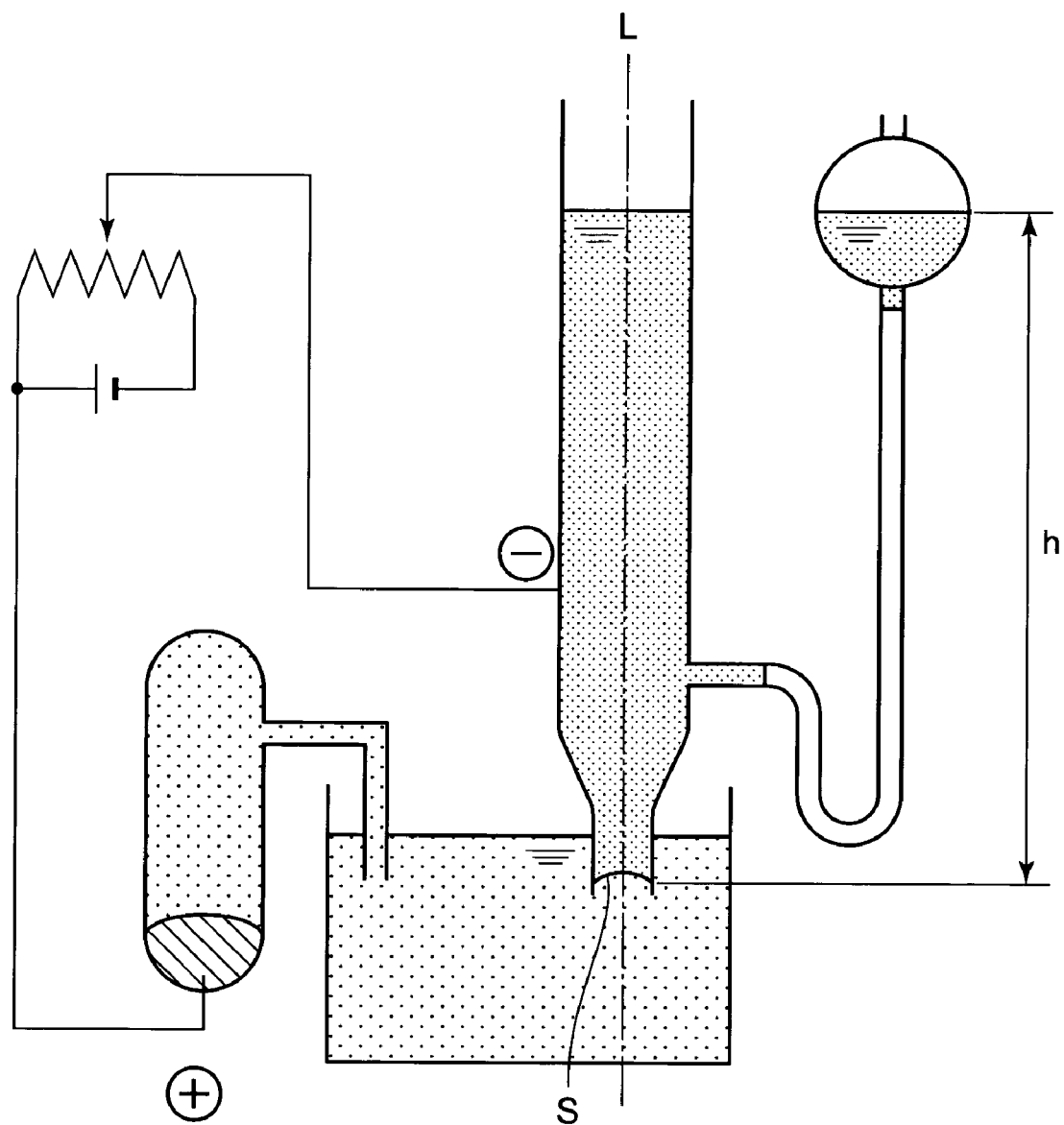

In addition, as shown in FIG. 9, the focal length may be changed by utilizing two types of liquids in a Lippmann electocapillary device and changing the height and interfacial tension of the interface (optical surface) in a capillary tube through electrocapillarity to deform the optical surface.

In this embodiment, the rigid lens 21 is, as shown in FIG. 2, a convex lens to thereby deflect the refracting force to a positive side. In addition, this rigid lens 21 is provided in such a manner as to be moved by a secondary moving device (not shown) in the invention, so that optical properties of the zoom lens unit 2 can be adjusted. Namely, even when there is a limitation on the variable areas of optical properties of the variable-focal-length lenses 3a, 3b, the refracting force of the zoom lens unit 2 is deflected to the positive or negative side by adjusting the position of the rigid lens 21, so that the focal length and focal point of the whole lens unit can be adjusted over a wide range.

A diaphragm 22 is provided between the rigid lens 21 and the variable-focal-length lens 3b.

A shutter 23 and a photographing element 24 are provided below the rigid lens 21. The shutter 23 is designed to be opened when a shutter release button 41 (refer to FIG. 1), which will be described later on, is depressed so as to allow light from the zoom lens unit 2 to hit the photographing element 24 for a predetermined duration. The photographing element 24 is such as a CCD which generates an analog signal according to the amount of light received.

The light and distance metering sensor 14 is such as to measure the amount of light and color temperature in the vicinity of a subject and a distance from the camera 1 to the subject (hereinafter, referred to as a subject distance) and is provided close to the photographing light intake window 13.

Figure 1B:
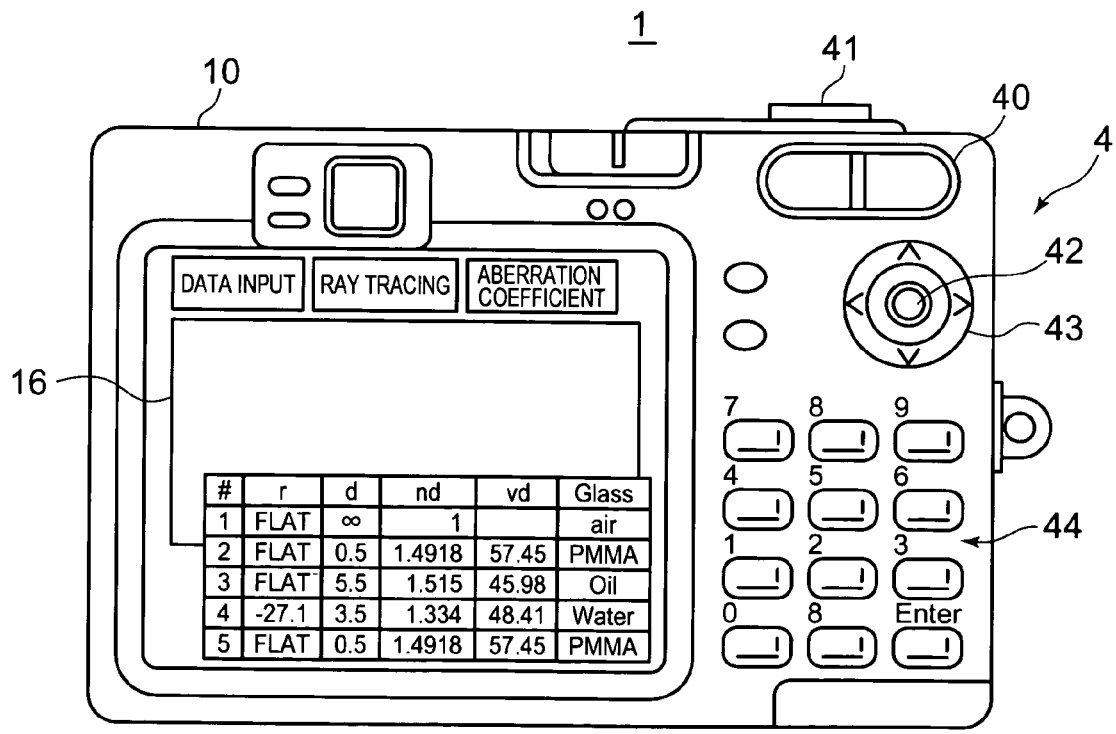

In addition, as shown in FIG. 1B, a display unit 16 is provided on a back side of the casing 10.

The display unit 16 is such as to be driven by a display drive unit 160 (refer to FIG. 2) so as to display a photographed image and an operation guide to the user or operator. Values of design parameters of the zoom lens unit 2 and results of a simulating operation on the optical properties of the zoom lens unit 2 are displayed on the display unit 16.

A control unit 4 is provided in the vicinity of the display unit 16.

There are provided a plurality of keys in the control unit 4, and in this embodiment, as shown in FIGS. 1A, 1B, there are provided a power supply switch 40 which switches on and off the power supply, the shutter release button 41 which instructs the shutter 23 to be opened and closed, a decision key 42 which indicates a decision made in each mode, a cursor key 43 which is operated to move vertically and laterally for selection, a ten-key pad 44 with which numerical values are inputted and a zoom key (not shown) which directs a zooming operation.

Control information on the variable design parameters of the zoom lens unit 2 and an instruction on the selection of design data in a program memory 66, which will be described later on, are inputted in the control unit 4 via those keys. Here, in this embodiment, the radii of curvatures and positions of the optical surfaces S of the variable-focal-length lenses 3a, 3b and the position of the rigid lens 21 are used as the variable design parameters.

In addition, as shown in FIG. 2, a control unit 5 is provided in the interior of the casing 10.

The control unit 5 includes a processing unit 50 and a photographing control unit 51.

The processing unit 50 is made up of a CPU and a ROM, a RAM and the like. This processing unit 50 is designed to change over modes of the camera 1 based on an operation indicating signal sent from the control unit 4 to, for example, a photographing mode, a lens unit design mode, a program design mode, a reproduction mode and the like.

In addition, in the photographing mode, the processing unit 50 is designed to calculate photographing conditions such as the focal length and focusing position of the zoom lens unit 2 and the white balance (WB) of an image to be photographed based on the operation instructing signal from the control unit 4 and results of measurement by the light and distance metering sensor 14. In addition, the processing unit 50 is designed to calculate a voltage to be impressed to the electrodes 34a, 34b of the variable-focal-length lenses 3a, 3b based on a table stored in the program memory 66. Furthermore, the processing unit 50 calculates a compensation amount of the impressed voltage to the variable-focal-length lenses 3a, 3b based on a temperature measured by the temperature sensor 15, an amount of light and a subject distance which are measured by the light and distance metering sensor 14 and a contrast that is calculated from an electric signal from the photographing element.

Additionally, the processing unit 50 is designed to obtain optical properties of the zoom lens unit 2 through a simulation operation based on the instruction information sent from the control unit 4, and in this embodiment, the optical properties include optical path and aberration, spot diagram, MTF (Modulation Transfer Function) and the like. In addition, the processing unit 50 is designed to evaluate the aberration, spot diagram and MTF properties through comparison with predetermined reference properties. Note that when used in this embodiment, the aberration means the so-called Seidel's five aberrations and color aberration.

The photographing control unit 51 corresponds to a control unit of the invention and is designed to control the variable design parameters of the zoom lens unit 2, that is, the radii of curvatures and positions of the optical surfaces S of the variable-focal-length lenses 3a, 3b and the position of the rigid lens 21 based on standard design data 66a and customized design data 66b, which will be described later on. In addition, this photographing control unit 51 is designed to control the flash unit 11, the diaphragm 22 and the variable-focal-length lenses 3a, 3b based on the photographing conditions and compensation amounts that are calculated by the processing unit 50.

Connected to this photographing control unit 51 are lens drive units 60a, 60b, a diaphragm drive unit 61, a shutter drive unit 62, a timing control unit 63, an image signal processing unit 65 and a flush unit drive unit 64.

The lens drive units 60a, 60b are such as to impress voltage to the electrodes 34a, 34b of the variable-focal-length lenses 3a, 3b and are designed to adjust the impressed voltage.

The diaphragm drive unit 61 is such as to adjust the stop amount of the diaphragm 22.

The shutter drive unit 62 is such as to control the opening and closure of the shutter 23 based on a signal sent from the shutter release button 41 on the control unit 4.

The timing control unit 63 is such as to make the image signal processing unit 65 perform a signal processing in synchronism with a photographing timing by the photographing element 24.

The image signal processing unit 65 is such as to apply a CDS (Correlated Double Sampling) processing, an AGC (Automatic Gain Control) processing and an A/D conversion processing to an analog signal sent from the photographing element 24.

The flash unit drive unit 64 is such as to drive the flash unit 11 to illuminate a flash light.

Connected to the control unit 5 that has been described above are, in addition to the control unit 4 and the display unit 16, the program memory 66 and a memory interface 67, an internal memory 68, an image processing unit 69, a compression and decompression unit 70, an information transmission unit 72 and a power supply control unit 71.

The program memory 66 corresponds to a storage unit of the invention and stores the standard design data 66a and customized data 66b of the zoom lens unit 2, and a standard control program 66c and a customized control program 66d of the camera 1, and an other models library 66e. In addition, as shown in FIG. 5B, this program memory 66 stores focal lengths of the variable-focal-length lenses 3a, 3b and impressed voltages to the electrodes 34a, 34b which are related to each other in the form of a table.

Here, the standard design data 66a and the customized design data 66b have, as a group of parameters of the invention, information on combinations of fixed values of remaining variable design parameters which result after at least two of the focal lengths and the curvatures and positions of the optical surfaces S of the variable-focal-length lenses 3a, 3b, and the position of the rigid lens 21 are excluded. Note that two or more variable design parameters that are excluded here, for example, the respective focal lengths of the variable-focal-lengths lenses 3a, 3b, are used to adjust the focusing position and focal length of the zoom lens unit 2.

In addition, the standard design data 66a mean design data of a default prepared by a manufacturer or the like, and the customized design data 66b mean design data prepared by the user or operator.

In addition, the standard control program 66c and customized control program 66d have information on operations of the respective units of the camera 1 and relational expressions between the two or more variable design parameters that are excluded from the combinations. In addition, the standard control program 66c means a control program of a default prepared by the manufacturer of the like, and the customized control program 66d means a control program prepared by the user.

In addition, the other models library 66e includes mocking design data 66f and a mocking control program 66g as control information of the invention. These mocking design data 66f and the mocking control program 66g are design data and a control program that are to be used to make the optical properties of the zoom lens unit 2 coincide with the optical properties of a zoom lens unit incorporated in a commercially available camera and the name of a commercially available zoom lens unit and the name of a commercially available camera are affixed thereto. Here, the optical properties of the zoom lens unit 2 mean values or ranges with respect to any of aberration property, spot diagram property, MTF property, focal length and focusing position of the zoom lens unit 2.

The memory interface (IF) 67 is such as to enable the transmission of image data and the photographing conditions between the external memory 67a and the internal memory 68.

The internal memory 68 is such as to store image data of a photographed image by the photographing element 24 and image data inputted from the external memory 67a via the memory interface 67. In addition, the inner memory 68 is designed to store the photographing conditions such as the foal lengths of the variable-focal-length lenses 3a, 3b while relating them to the image data.

The image processing unit 69 is such as to implement various types of image processing on the image data stored in the internal memory 68.

The compression and decompression unit 70 is such as to compress to encode the image data of a photographed image by the photographing element 24, as well as decompressing to decode the image data stored in the external memory 67a and the internal memory 68.

The information transmission unit 72 is such as to transmit and receive information on the standard design data 66a, the customized design data 66b, the mocking design data, the standard control program 66c, the customized control program and the mocking control program 66g and enables the storage of design data and control programs that are designed by external equipment in the program memory 66 and the transmission of the design data and control programs that are stored in the program memory 66 to the external equipment for use by other cameras. This information transmission unit 72 includes a radio transmission unit 720 and an input/output IF 722.

The radio transmission unit 720 is such as to implement radio transmission and reception of information with external equipment (not shown) via an antenna 721, and the input/output IF 722 is such as to implement wired transmission and reception of information with the external equipment (not shown).

The power supply control unit 71 is such as to supply electric power from a battery 71a to the control unit 5.

Following the above, the operation of the zoom lens unit 2 will be described by reference to the drawings.

Figure 10:
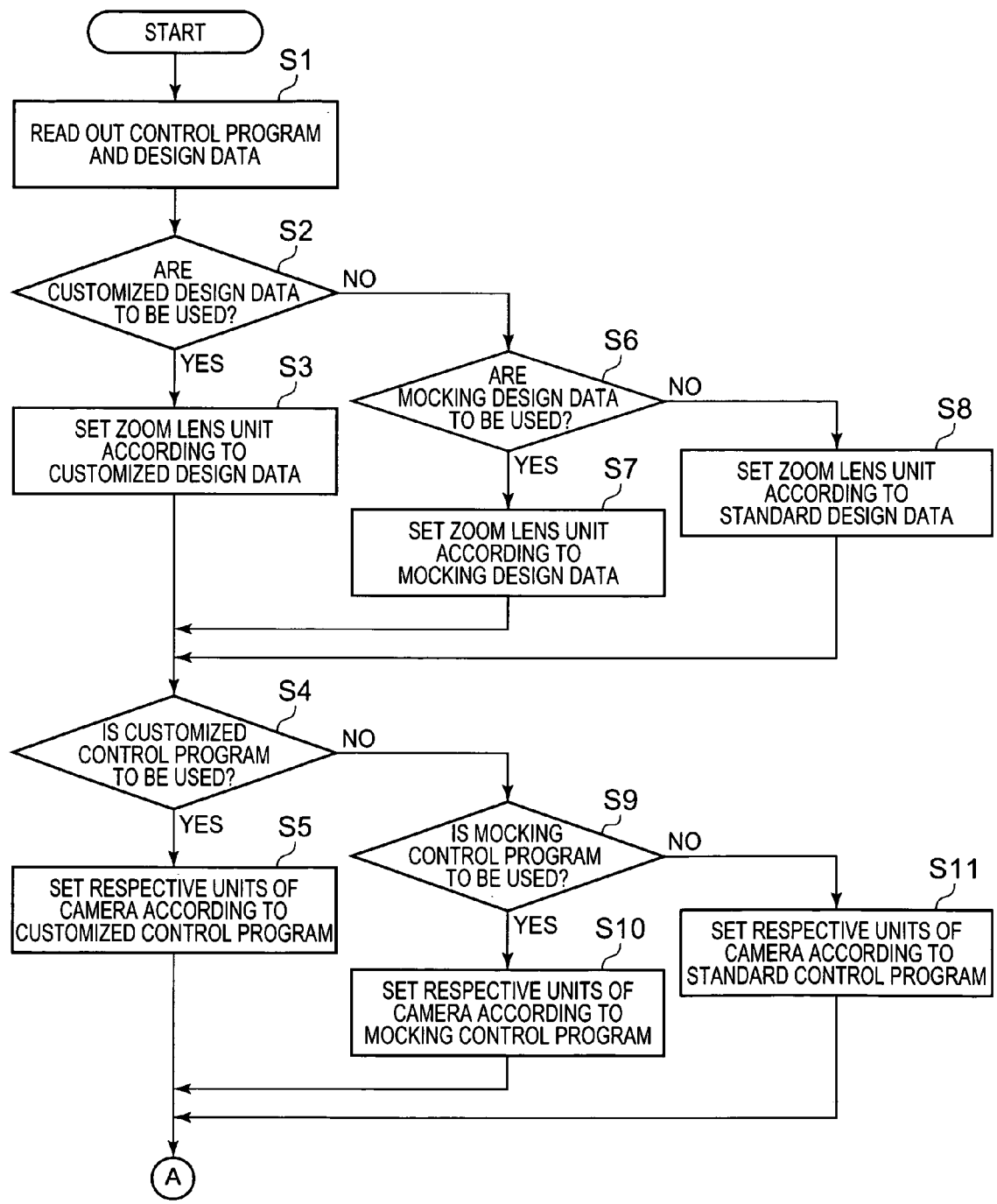
Figure 11B:
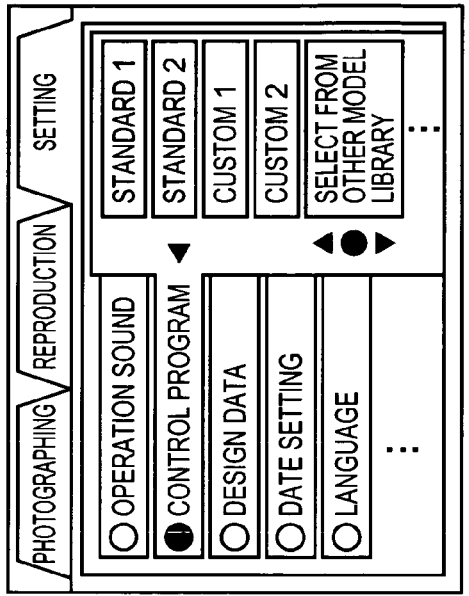
FIGS. 11A to 11D show operation guides displayed at a display unit.

Firstly, as shown in FIG. 10, when the power supply of the camera 1 is turned on, after initializing, the control unit 5 reads out the standard design data 66a, the customized design data 66b, the mocking design data 66f, the standard control program 66c, the customized control program 66d and the mocking control program 66g from the program memory 66 and the external equipment. Then, the control unit 5 displays the contents or file names of the data and programs so read out at the display unit 16 in the form of operation guides, for example, in such an order that is shown in FIGS. 11A to 11C (step S1). Here, as shown in FIG. 11C, since the names of an existing camera and an existing lens unit are displayed at the display unit 16 as the contents of the mocking design data 66f and the mocking control program 66g, the contents of these mocking design data 66f and mocking control program 66g can be grasped easily and accurately.

Figure 11D:
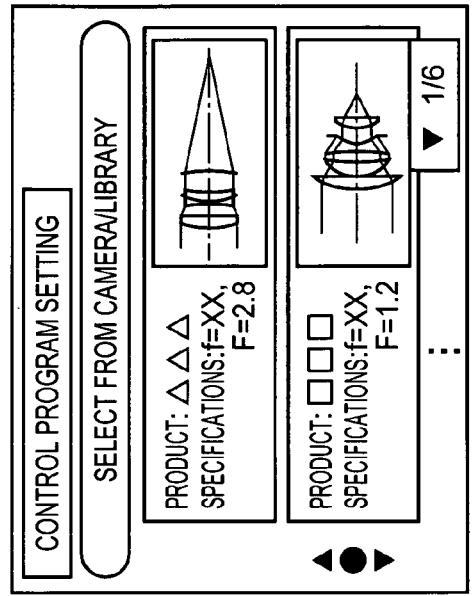
Figure 11A:
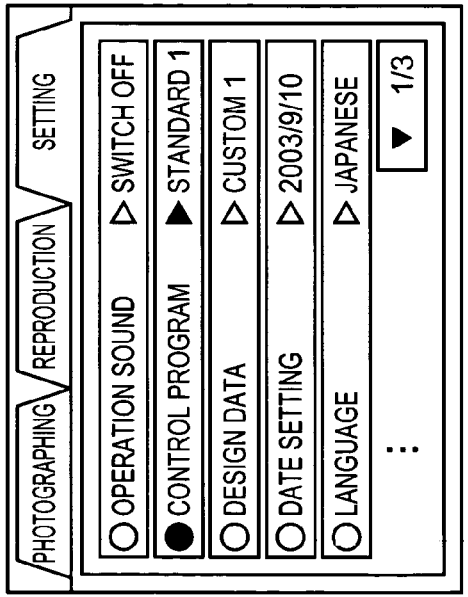
Figure 11C:
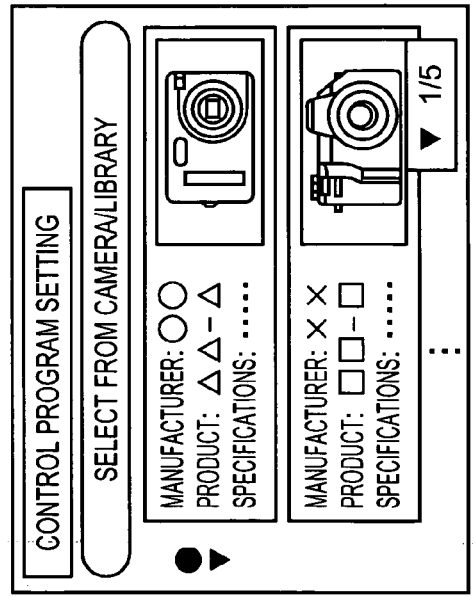

Note that in FIG. 11C, while the contents of the mocking control program 66g are displayed as the name of the manufacturer of a camera that is mocked, as shown in FIG. 11D, the product name of the camera and the specification thereof, the contents may be displayed as the product name, specifications, optical properties, external view, design drawing, ray tracing chart and the like of a lens unit that is incorporated in the interior of the camera to be mocked. In this case, as well, the contents of the mocking design data 66f and the mocking control program 66g can be grasped easily and accurately.

Next, the control unit 5 determines whether or not the displayed customized design data 66b have been selected (step S2), and if the customized design data 66b are selected (step S2; Yes), the control unit 5 controls the variable design parameters of the zoom lens unit 2 based on the customized design data 66b (step S3).

Next, the control unit 5 determines whether or not the customized control program 66d has been selected (step S4), and if the customized control program 66d has been selected (step S4; Yes), the control unit 5 controls the respective units of the camera 1 based on the customized control program 66d (step S5).

On the other hand, if the customized design data have not been selected in step S2 (step S2; No), the control unit 5 determines whether or not the mocking design data 66f have been selected (step S6).

If the mocking design data 66f have been selected in this step S6 (step 6; Yes), the photographing control unit 51 control the design parameters of the zoom lens unit 2 based on the mocking design data 66f (step S7), whereby the values of the respective design parameters are put in a predetermined state, to be more specific, a state in which the zoom lens unit 2 and the existing zoom lens unit and camera have equal optical properties based on the mocking design data 66 in the program memory.

In addition, if the mocking design data 66f are not selected in step S6 (step S6; No), the photographing control unit 51 controls the variable design parameters of the zoom lens unit 2 based on the standard design data 66a (step S8).

Additionally, if the customized control program 66d is not selected in step S4 (step S4; No), the control unit 5 determines whether or not the mocking control program 66g has been selected (step S9).

If the mocking control program 66g is selected in this step S9 (step S9; Yes), the control unit controls the respective units of the camera 1 based on the mocking control program 66g (step S10), whereby the camera 1 is put in a state in which the camera 1 has equal optical properties to those of the existing camera.

In addition, if the mocking control program 66g is not selected in step S9 (step S9; No), the control unit 5 control the respective units of the camera 1 based on the standard control program 66c (step S11).

Figure 13:
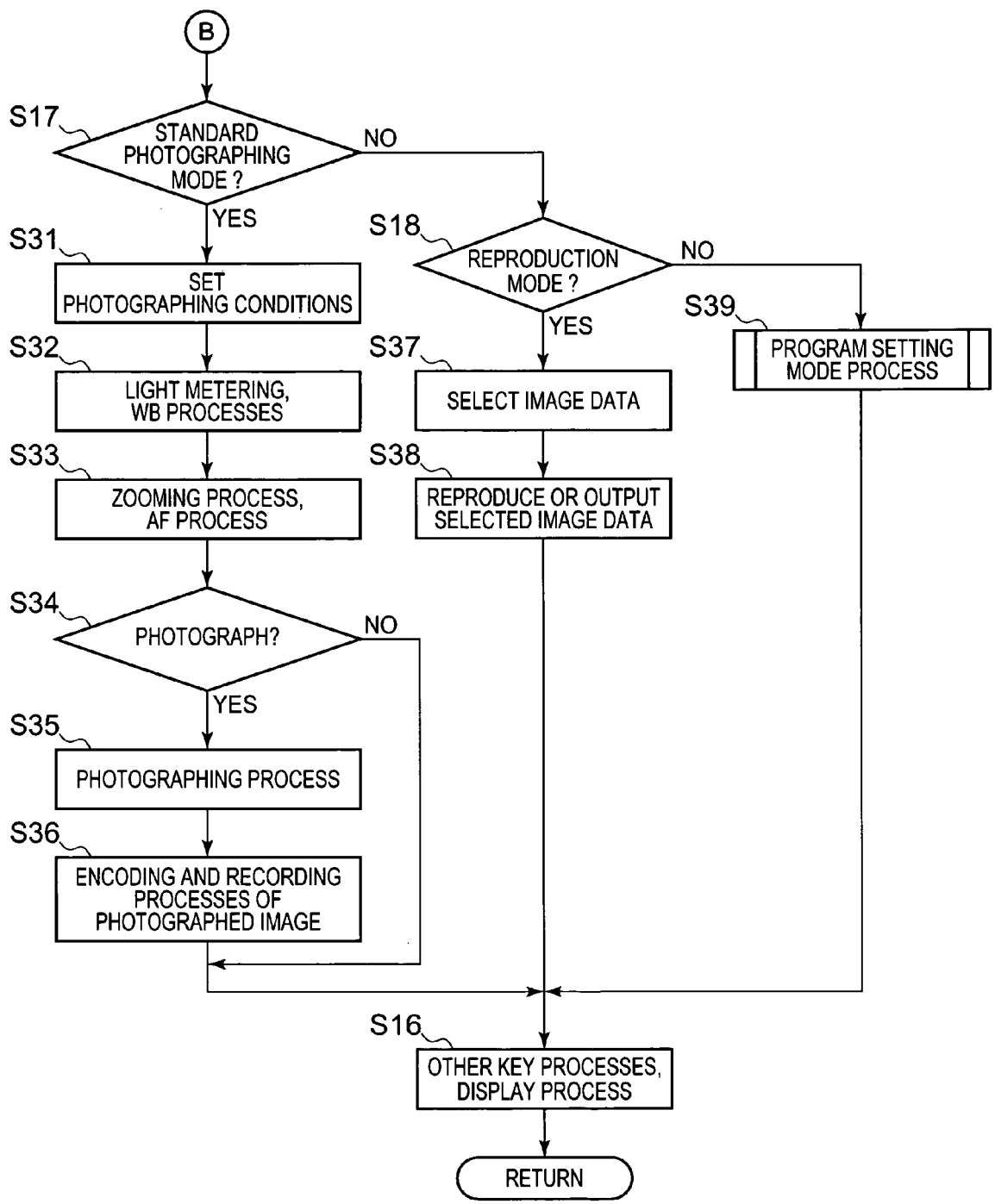

Next, as shown in FIGS. 12, 13, the control unit 5 an instruction to select the modes of the camera 1 at the display unit 16 and determines sequentially whether the user has made his or her decisions on the selection of the lens unit design mode, program design mode, program debugging mode; photographing mode by the customized control program 66d (hereinafter, referred to as a customized photographing mode), photographing mode by the mocking control program 66g (hereinafter, referred to as an other model photographing mode), photographing mode by the standard control program 66c (hereinafter, referred to as a standard photographing mode) and reproduction mode (steps S12 to S18).

If the lens unit design mode is selected in this step S12 (step S12; Yes), the control unit 5 performs a lens unit design mode process (step S19).

Figure 14:
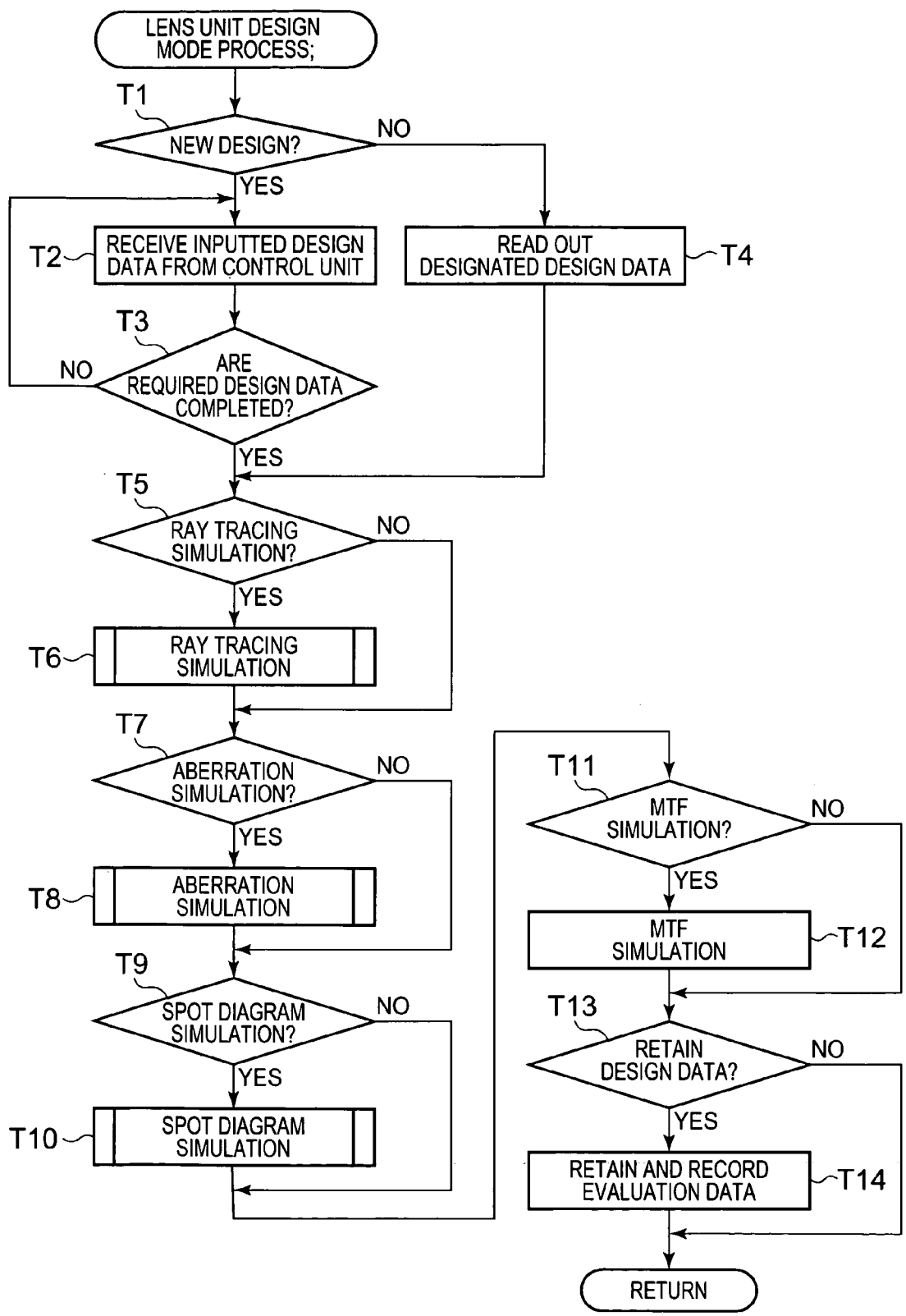
FIG. 14 is a flowchart showing a lens unit design mode process.

To be specific, as shown in FIG. 14, the processing unit 50 displays at the display unit 16 an instruction to select whether to set new customized design data and determines whether or not the new design has been selected (step T1).

In this step T1, if the design of new design data is selected (step T1; Yes), the processing unit 50 displays at the display unit 16 an instruction to input design data on the variable design parameters such as the curvatures, positions and refractive indices of the variable-focal-length lenses 3a, 3b and the position of the rigid lens 21 and thereafter receives a indicating signal of design data from the control unit 4 (step T2). Next, the processing unit 50 determines whether or not required design data have been received completely (step T3), and if the design data are not complete (step T3; No), then, return to the step T2, whereas if complete (step T3; Yes), then a process in step T5, which will be described later on, is executed. Here, being different from the conventional case, by adjusting the optical properties of the plurality of variable-focal-length lenses 3a, 3b provided in the zoom lens unit 2, the optical properties of the lens unit 2 can be adjusted over a wide range without exchanging lenses. In addition, since the design data have information on the design data at fixed values, specific simulation operations can be implemented in steps T6, T8, T10 and T12, which will be described later on.

On the other hand, if the design of new design is not selected in step T1 (step T1; No), the processing unit 50 reads out the standard design data 66a or the customized design data 66b which is designated by the user from the program memory 66 (step T4).

Next, the control unit 5 displays at the display unit 16 an instruction to select whether to obtain an optical path in the zoom lens unit 2 when the control is carried out based on the obtained design data through a simulation operation and determines whether or not the implementation of the simulation operation has been selected (step T5).

If the implementation of the simulation operation is not selected in this step T5 (step T5; No), the processing unit 50 executes a process in step T7, which will be described later on, whereas if the implementation of the simulation operation is selected (step T5; Yes), the processing unit 50 executes an operation for ray tracing simulation (step T6).

Figure 15:
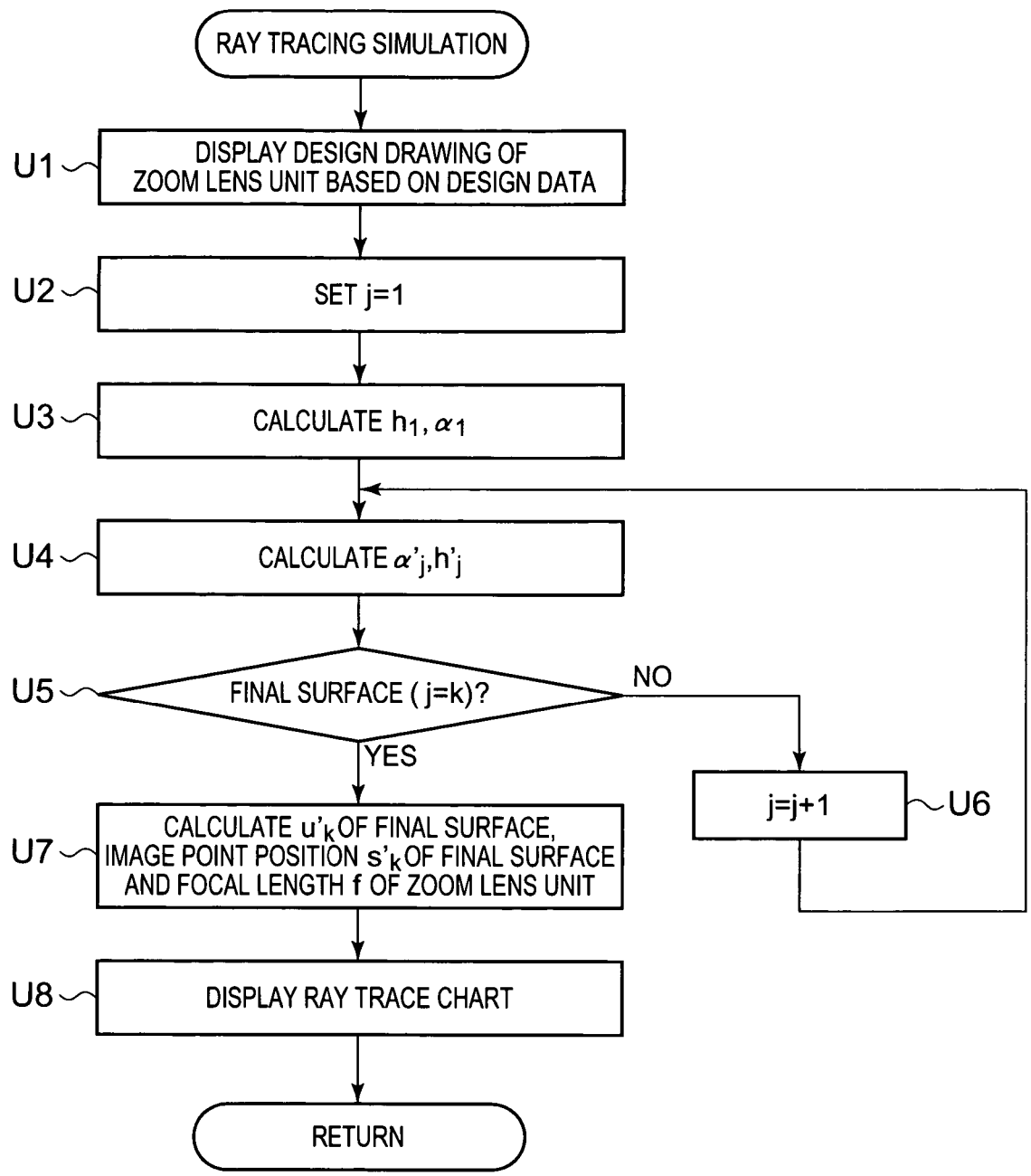
FIG. 15 is a flowchart showing a ray tracing simulation operation.

To be specific, as shown in FIG. 15, firstly, the processing unit 50 displays at the display unit 16 a design drawing of the zoom lens unit 2 based on the design data (step U1).

Next, the processing unit 50 sets a surface number j of an optical surface in the zoom lens unit 2 to 1 (step U2). Note that in the following description, the number of optical surfaces in the zoom lens unit 2 is k as a matter of convenience.

Figure 16:
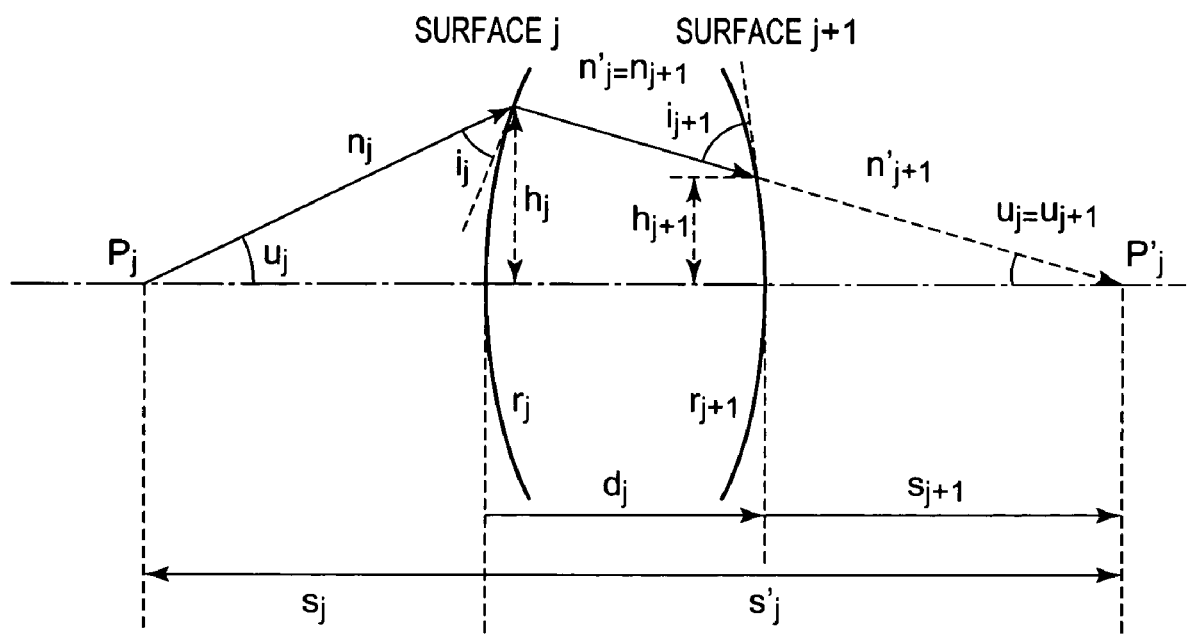
FIG. 16 is a diagram which explains a ray tracing method.

Next, the processing unit 50 calculates a parameter α1 (=n1·u1) and a height h1 at which a ray of light cuts through an optical surface of a surface number 1 (hereinafter, referred to as a first surface) (step U3). Here, as shown in FIG. 16, "n" denotes a refractive index of a medium and "u" denotes an angle that an incident light forms with an optical axis L. In addition, letters added to respective symbols such as "j" and "j+1" are values which indicate surface numbers of the optical surfaces.

Next, utilizing the following equations (20), (21), the processing unit 50 obtains $\alpha_j$, $h_j$ for each optical surface and stores them in the program memory 66 (step U4). Note that in the equations, "r" denotes the radius of curvature of an optical surface and "d" denotes a distance to the next optical axis on the optical axis. In addition, when "'" is given to a symbol, it indicates that a parameter denoted by the symbol constitutes an image side (a back side) parameter relative to the optical surface, whereas when no such mark is given to a symbol, it indicates that a parameter denoted by the symbol constitutes an object side (a front side) parameter.

$$\alpha'_j = \alpha_{j+1} = \alpha_j + h_j(n'_j - n_j)/r_j \quad (20)$$

$$h'_j = h_{j+1} = h_j - \alpha'_j \cdot d_j/n'_j \quad (21)$$

Next, the processing unit 50 determines whether or not a value of the surface number j is k (step U5), if not k (step U5; No), 1 is added to the value of the surface number (step U6), and return to the process in step U4.

On the other hand, if the surface number j is k in step U5, in other words, if $\alpha_j$, $h_j$ are obtained with respect to a final surface (step U5; Yes), an angle $u'_k$ and an image point position $s'_k$ with respect to a final surface and an image side focal length f' of the zoom lens unit 2 are obtained from the following equations (22) to (24) and are then displayed at the display unit 16 (step U7). In addition, as this occurs, the processing unit 50 obtains effective aperture, aperture ratio, entrance pupil and exit pupil of the zoom lens unit 2 by known techniques and then displays them at the display unit 16.

$$u'_k = \alpha'_k/n'_k \quad (22)$$

$$s'_k = BF = h_k/u'_k \quad (23)$$

$$f' = h_1/u'_k \quad (24)$$

where, in Equation (23), "BF" denotes the back-focal distance of the zoom lens unit 2.

Next, the processing unit 50 simulation operates ray tracing in the zoom lens unit 2 by connecting points at the height $h_j$ in the respective surfaces of the zoom lens unit 2 and displays at the display unit 16 a ray trace chart as a result of the simulation operation (step U8), ending the ray tracing simulation operation.

Thus, since the results of the ray tracing simulation operation of the zoom lens unit 2 are displayed at the display unit 16, the design contents of the zoom lens unit 2 can be evaluated accurately regardless of availability of high-degree expert knowledge and abundant experience.

Next, as shown in FIG. 14, the processing unit 50 displays at the display unit 16 an instruction to select whether to obtain aberrations in the designed zoom lens unit 2 through a simulation operation and determines whether or not the implementation of the simulation operation has been selected (step T7).

If the implementation of the simulation operation is not selected in this step T7 (step T7; No), the processing unit 50 executes a process in step T9, which will be described later on, whereas if the implementation of the simulation operation is selected (step T7; Yes), the simulation operation is executed to measure aberrations (step T8).

Figure 17:
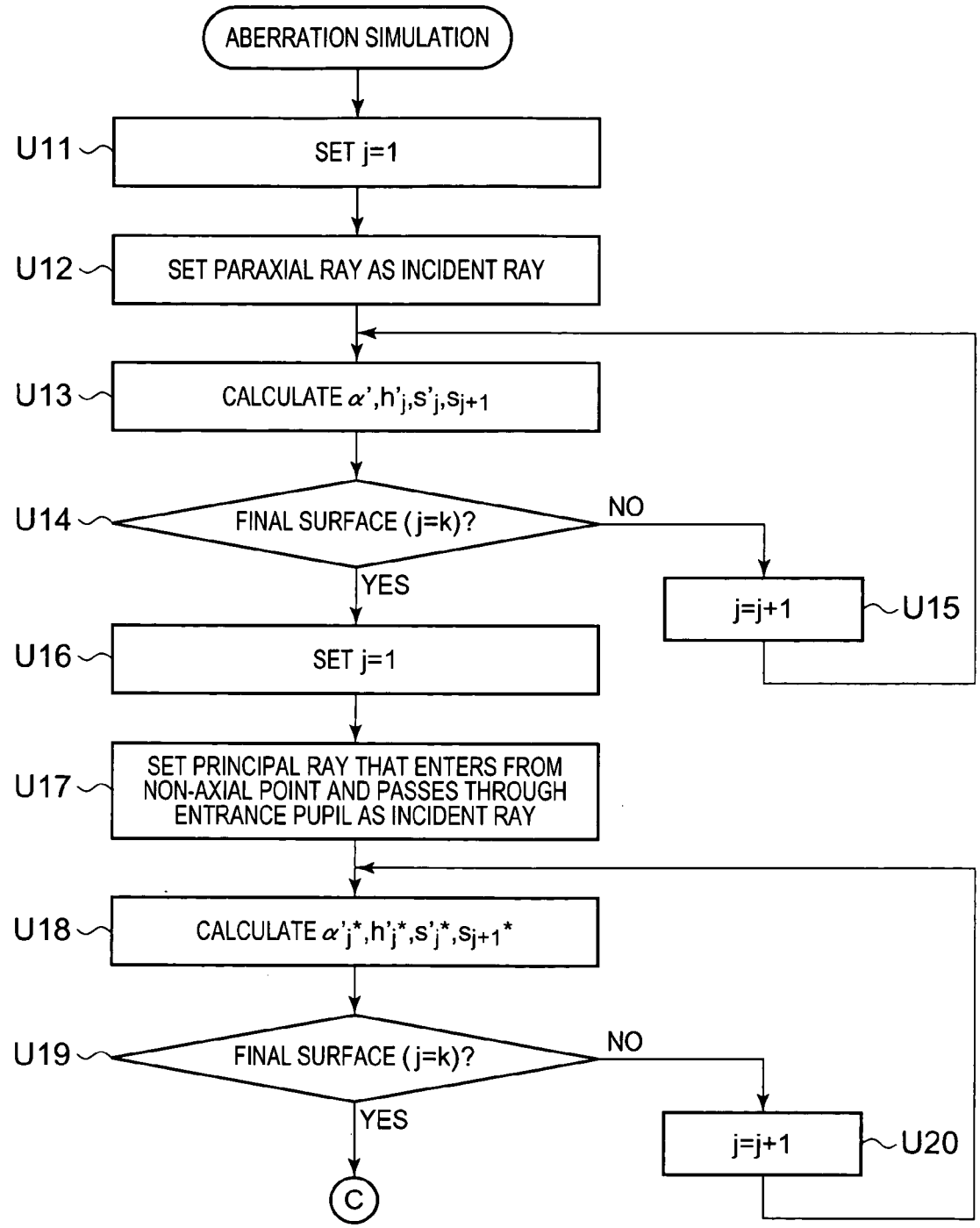
FIGS. 17 and 18 are flowcharts showing an aberration measuring simulation operation, and FIGS. 19A and 19B equations that are used for calculation of aberrations.

To be specific, as shown in FIG. 17, firstly, the processing unit 50 sets the surface number j of the optical surface in the zoom lens unit 2 to 1 (step U11).

Next, the processing unit 50 sets an paraxial ray as an incident ray on the zoom lens unit 2 (step U12). As this occurs, the processing unit 50 sets, for example, $u_1=1/a$, $h_1=s1 \cdot u_1$, $\alpha_1=n_1 \cdot u_1$ and enables the comparison of aberration performances even on optical systems whose focal lengths and aperture sizes are different by normalizing such that the height h of a transmitted ray through an object side principal surface becomes 1. Note that "a" denotes a distance from the object point to the object side principal point. In addition, this normalization may be implemented by making the focal length f become 1 or making the diagonal length of the angle of view of a photographed image become 1.

Next, the processing unit 50 obtains $\alpha'_j$, $h'_j$ and $s'_j$ with respect to the respective optical surfaces from the above equations (20) to (22) and the following equations (25), (26) and stores them in the program memory 66 (step U13).

$$s'_j = h_j/u'_j = h_j \cdot n'_j/\alpha'_j \tag{25}$$

$$s_{j+1} = s'_j - d_j \tag{26}$$

Next, the processing unit 50 determines whether or not the value of the surface number j is k (step U14), and if not k (step 14; No), then add 1 to the surface number (step U15) and return to the process in step U13, whereby ray tracing of paraxial rays are performed sequentially from the object side toward the image side.

On the other hand, if the surface number j is k in step U14, in other words, $\alpha'_j$, $h'_j$ and $s'_j$ are obtained with respect to the final surface (step U14; Yes), the processing unit 50 sets the surface number j of the optical surface of the zoom lens unit 2 to 1 again (step U16).

Next, the processing unit 50 sets a principal ray from a non-axial point to the entrance pupil as an incident ray on the zoom lens unit (step U17). As this occurs, the processing unit 50 sets, for example, $u1^*=-a/a^*$, $h1^*=z^* \cdot u1^*$, $\alpha1^*=n1 \cdot u1^*$, and enables the comparison of aberration performance even on an optical system whose focal length and aperture size are different by normalizing such that an angle $\omega$ from the object side principal point to the object height becomes $(-1)$.

Next, the processing unit 50 obtains $\alpha'_j{}^*$, $h'_j{}^*$ and $s'_j{}^*$ with respect to each optical surface from the following equations (27) to (30) and stores them in the program memory 66 (step U18).

$$\alpha'_j{}^* = \alpha_{j+1}{}^* = \alpha_j{}^* + h_j{}^*(n'_j - n_j)/r_j \tag{27}$$

$$h'_j{}^* = h_{j+1}{}^* = h_j{}^* - \alpha'_j{}^* \cdot d_j/n'_j \tag{28}$$

$$s'_j{}^* = h_j{}^*/u'_j{}^* = h_j \cdot n'_j/\alpha'_j{}^* \tag{29}$$

$$s_{j+1}{}^* = s'_j{}^* - d_j \tag{30}$$

Next, the processing unit 50 determines whether or not the value of the surface number j is k (step U19), if not k (step U19; No), add 1 to the surface number (step U20) and return to the process in step U18, whereby the ray tracing of the principal ray is performed sequentially from the object side to the image side.

Figure 18:
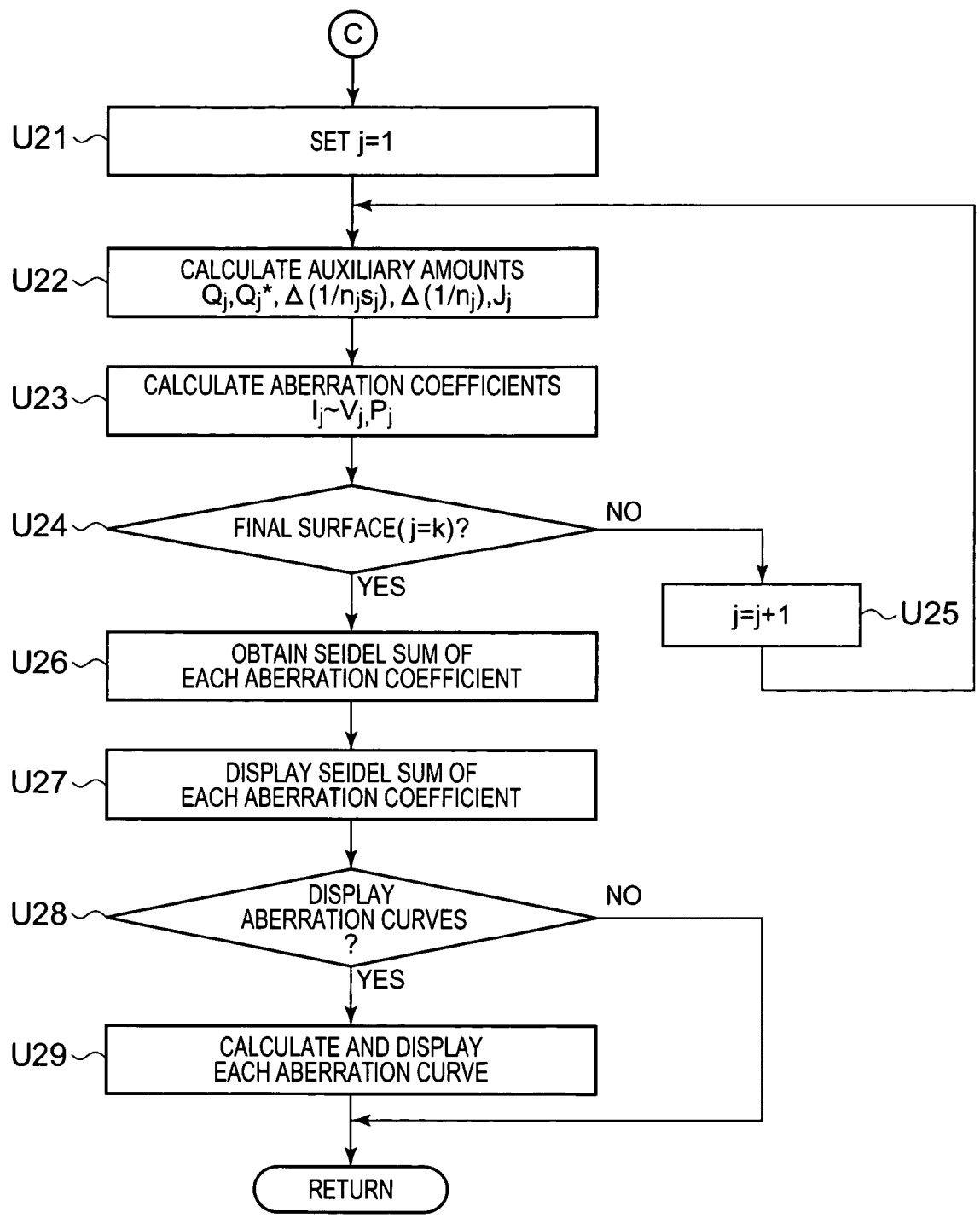

On the other hand, if the surface number is k in step U19, in other words, if $\alpha'_j{}^*$, $h'_j{}^*$ and $s'_j{}^*$ are obtained with respect to the final surface (step U19; Yes), as shown in FIG. 18, the processing unit 50 sets the surface number j of the optical surface in the zoom lens unit 2 to 1 again (step U21).

Next, the processing unit 50 calculates auxiliary amounts $Q_j$, $Q_j{}^*$, $\Delta(1/n_j s_j)$, $\Delta(1/n_j)$ and $J_j$ by utilizing equations shown in FIG. 19A (step U22) and calculates aberration coefficients $I_j$ to $V_j$, $P_j$ from the following equations (31) to (36) (step U23)

$$I_j = h^4 Q^2 \cdot \Delta(1/n_j s_j) \tag{31}$$

$$II_j = J_j \cdot I_j \tag{32}$$

$$III_j = J_j \cdot II_j \tag{33}$$

$$IV_j = III_j + P_j \tag{34}$$

$$V_j = J_j \cdot IV_j \tag{35}$$

$$P_j = -(1/r_j) \cdot \Delta(1/n_j) \tag{36}$$

Next, the processing unit 50 determines whether or not the value of the surface number j is k (step U24), and if not k (step U24; No), add 1 to the surface number (step U25) and return to the process in step U22, whereby the calculation of aberration coefficients is performed sequentially from the object side to the image side.

On the other hand, if the surface number j is k in step U24, in other words, $I_j$ to $V_j$ and $P_j$ are obtained with respect to the final surface (step U24; Yes), the processing unit 50 obtains, as shown in FIG. 19B, Seidel sums I to V and P for each aberration coefficient by totaling aberration coefficients of each surface (step U26). In addition, the processing unit 50 obtains an axial chromatic aberration $\Delta S'$ and a chromatic difference of magnification $\Delta Y'$ from the following equations (37), (38). However, in the equations, "$v_j$" denotes an Abbe number $(=(n_d - 1)/(n_F - n_c))$, and "$n_c$", "$n_d$" and "$n_F$" denote refractive indices in wavelengths of line C, line d and line F.

$$\Delta S' = -(1/\alpha'_k{}^2) \cdot \Sigma h_j{}^2/(v_j \cdot f_j) \tag{37}$$

$$\Delta Y' = -(1/\alpha'_k) \cdot \Sigma h_j{}^2 \cdot q_j/(v_j \cdot f_j) \tag{38}$$

Next, the processing unit 50 displays the respective aberration coefficients, Seidel sums, axial chromatic aberration and chromatic difference of magnification at the display unit 16 (step U27). In addition, the processing unit 50 evaluates an image forming performance of the zoom lens unit 2 based on the results of calculations and displays the evaluation results at the display unit 16, whereby when compared with a case where the user evaluates the image forming performance, the design contents of the zoom lens unit 2 can be evaluated easily and accurately.

Next, the processing unit 50 displays at the display unit 16 an instruction to select whether to display an aberration curve and determines whether or not the display of aberration curve has been selected (step U28). Then, if the display of aberration curves is not selected (step U28; No), the processing unit 50 ends the simulation operation of aberration measurement directly.

On the other hand, if the display of aberration curve is selected in step U28 (step U28; Yes), the processing unit 50 calculates each aberration curve for lens surface or height (angle) of the image height and displays an aberration curve so calculated at the display unit 16 (step U29), ending the simulation operation of aberration measurement. Thus, since the results of the simulation operation of aberration measurement of the zoom lens unit 2 are displayed at the display unit 16, the contents of the design of the zoom lens unit 2 can be evaluated accurately regardless of availability of high-degree expert knowledge and abundant experience.

$$\Delta y = -(1/2\alpha'k)[I \cdot h^3 \cos\Phi - II \cdot (n1 \cdot \tan\omega)h^2(2 + \cos2\phi) + \\ (3III + P) \cdot (n1 \bullet \tan\omega)^2 \cdot h \cdot \cos\Phi - V \cdot (n1 \cdot \tan\omega)^3] \tag{39}$$

$$\Delta x = -(1/2\alpha'k)[I \cdot h^3 \sin\Phi - \\ II \cdot (n1 \cdot \tan\omega)h^2 \cdot \sin2\phi + (III + P) \cdot (n1 \cdot \tan\omega)^2 \cdot h \cdot \sin\Phi] \tag{40}$$

Next, as shown in FIG. 14, the control unit 5 displays at the display unit 16 an instruction to select whether to obtain spot diagrams of the designed zoom lens unit 2 through a simulation operation and determines whether or not the implementation of a simulation operation has been selected (step T9).

If not the implementation of a simulation operation is not selected (step T9; No), the control unit 5 executes a process in step T11, which will be described later on, whereas when the implementation of a simulation operation is selected (step T9; Yes), the processing unit 50 executes calculations of spot diagrams (step T10).

Figure 20:
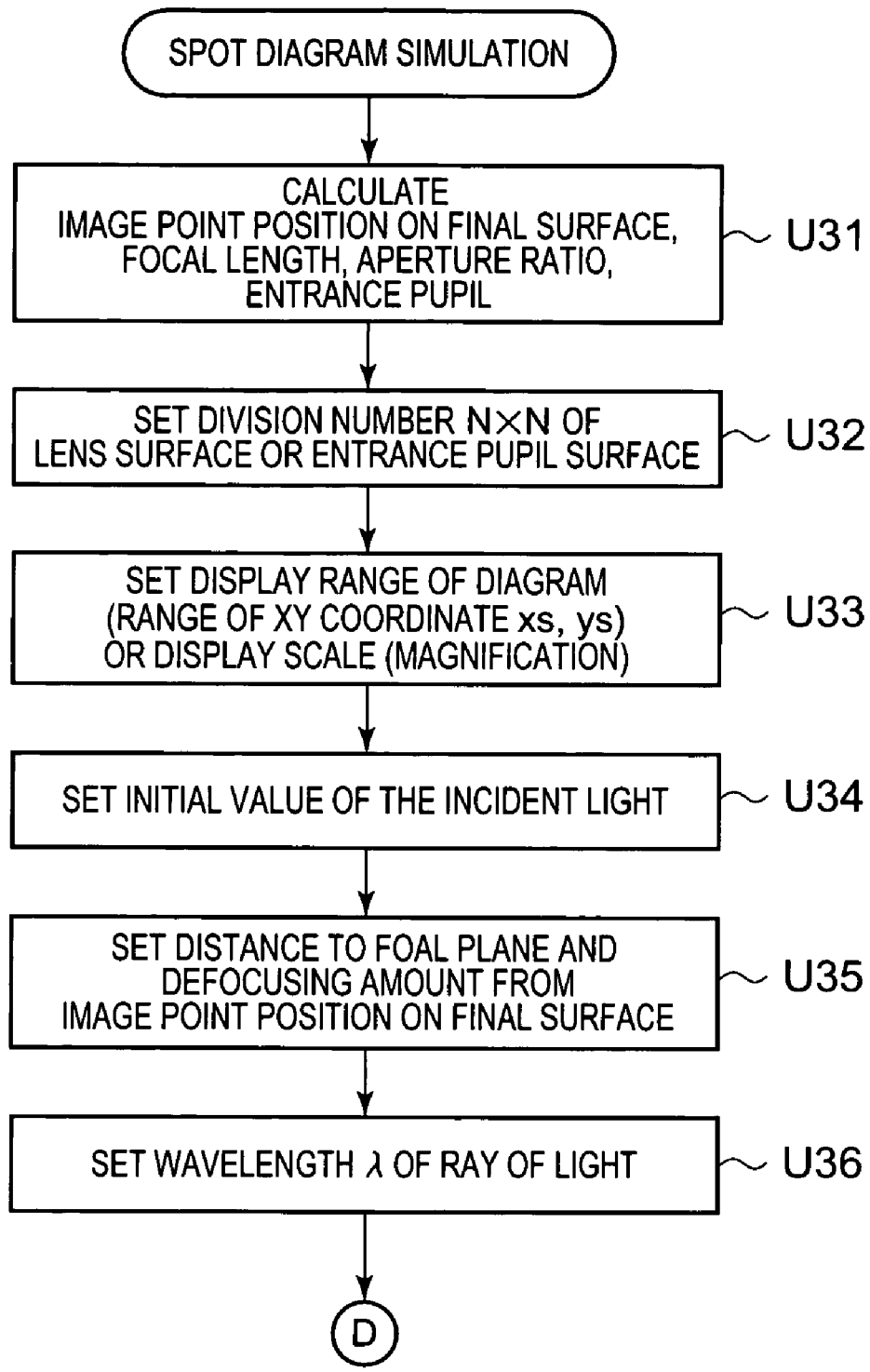
FIGS. 20 and 21 are flowcharts showing a spot diagram measuring simulation operation.

To be specific, as shown in FIG. 20, firstly, the processing unit 50 obtains an angle $u'_k$ and an image point position $s'_k$ of the final surface and effective aperture, aperture ratio, entrance pupil and exit pupil of the zoom lens unit 2 in a similar manner to in the steps U1 to U7 (step U31).

Next, based on an instruction from the user, the processing unit 50 sets a division number N×N of the lens surface or the surface of the entrance pupil and a display range of spot diagrams (range Xs, Ys on XY coordinates) or display scale (magnification) (step U32, step U33).

Next, the processing unit 50 sets an initial value of the incident light and a distance dk from the final surface to a focal plane or a defocusing amount (+/−dz) from the image point position on the final surface (step U34, step U35) and then sets a wavelength of the incident ray λ (step U36). Here, the initial value of the incident ray means, for example, an object point position do, an angle of incidence, an initial unit vector of the incident ray and the like. In addition, the defocusing amount means a value expressed by dk=BF+/−dz.

Figure 21:
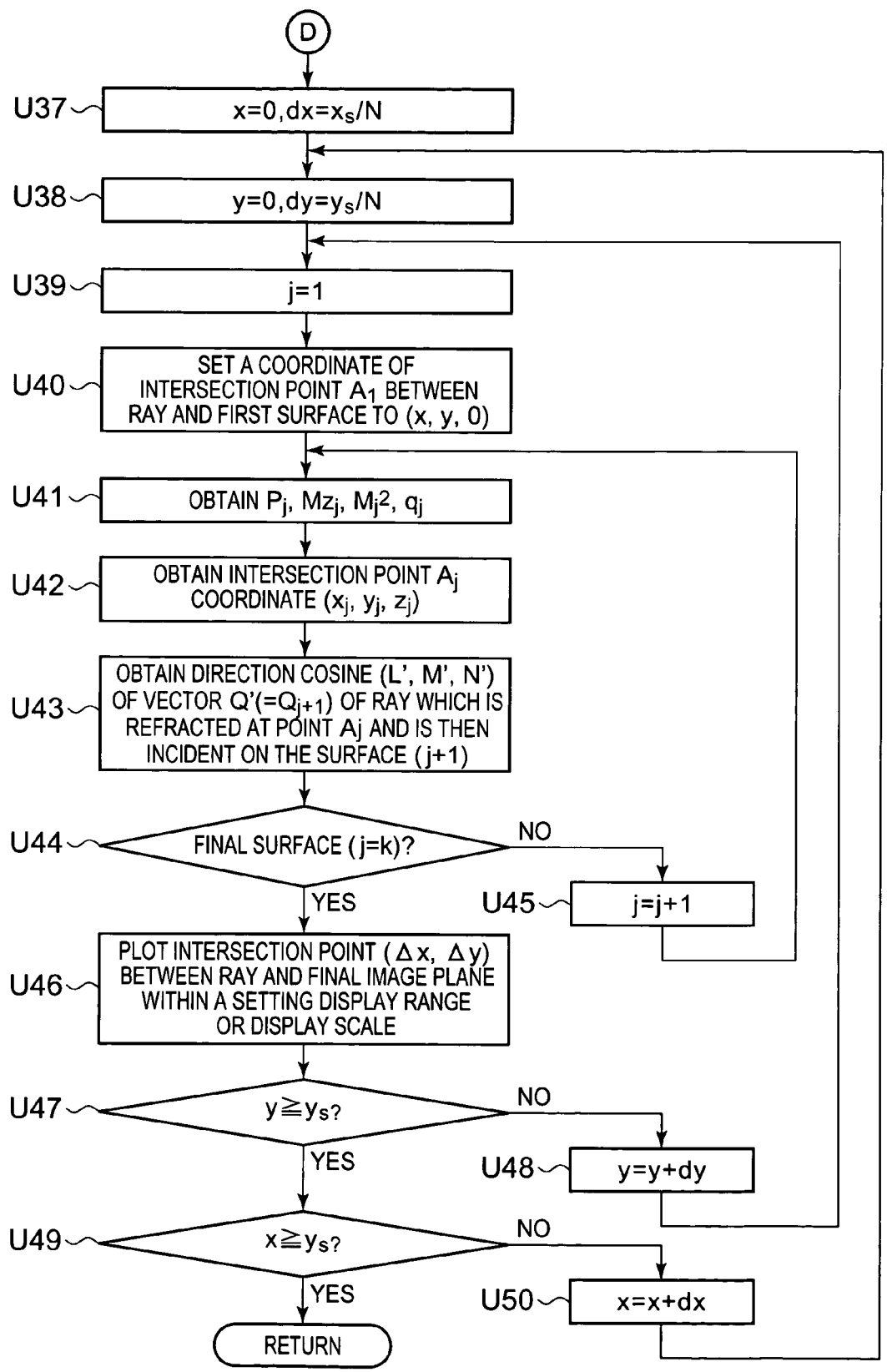

Next, as shown in FIG. 21, the processing unit 50 calculates dx=xs/N from values of xs and N which are set in step U33 and sets a variable x to 0 (step U37).

Next, the processing unit 50 calculates dy=ys/N from values of ys and N which are set in steps U32 and U33 and sets a variable y to 0 (step U38).

Next, the processing unit 50 sets the surface number j of the optical surface in the zoom lens unit 2 to 1 (step U39) and then sets a coordinate (x, y, 0) of an intersection point A1 between the ray and the first surface (step U40).

Figure 22:
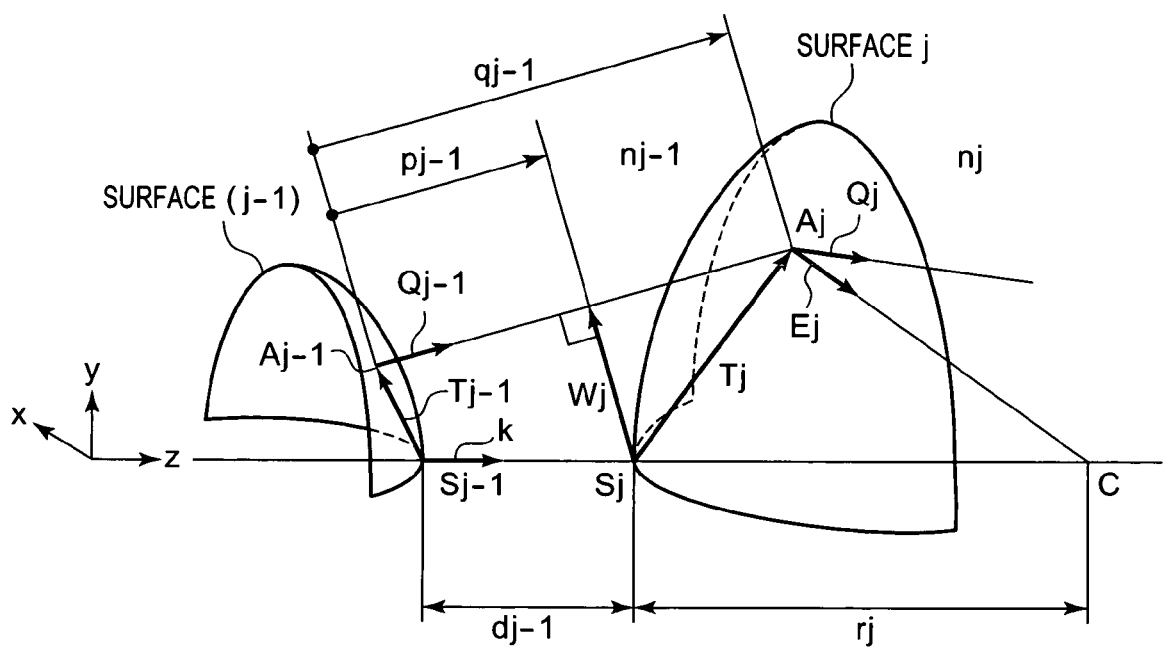
FIG. 22 is a diagram which explains a method of spot diagram calculation.
Figure 23A:
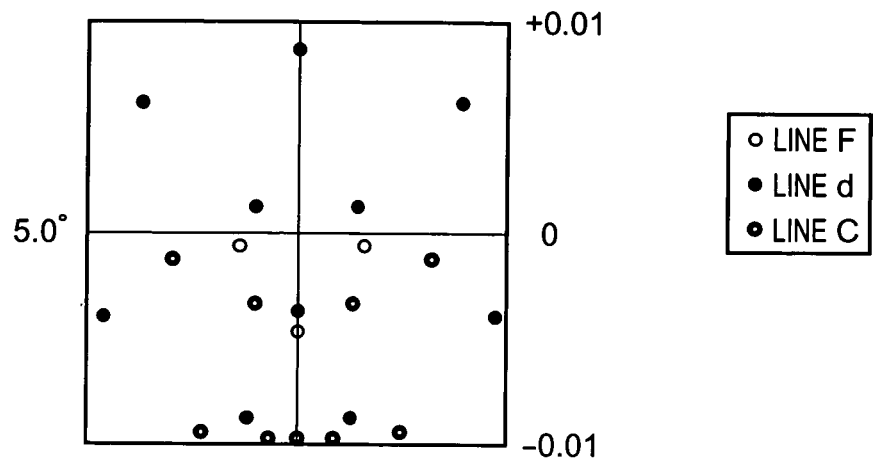
FIGS. 23A to 23C show diagrams which show spot diagrams.
Figure 23B:
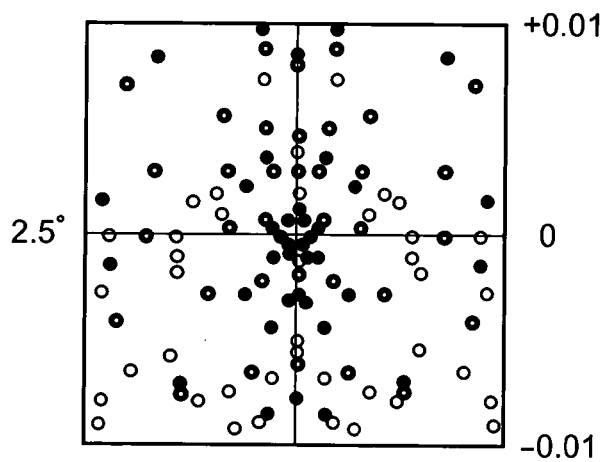
Figure 23C:
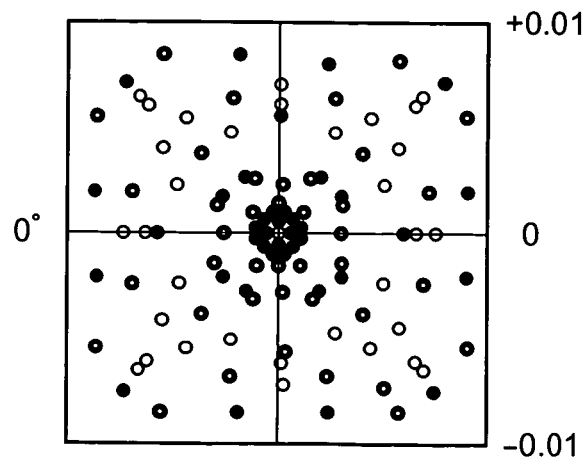

Next, as shown in FIG. 22, the processing unit 50 puts in the following equations (41) to (44) a direction cosine ($L_{j-1}$, $M_{j-1}$, $N_{j-1}$) of a unit vector $Q_{j-1}$ of a ray that exits from a point $A_{j-1}$ on a surface (j−1) to be incident on a point $A_j$ on a surface (j), a vector $T_{j-1}$ from an intersection point $S_{j-1}$ between the surface (j−1) and the ray, a curvature of the surface (j), a perpendicular vector $W_j$ from a point $S_j$ to the unit vector $Q_{j-1}$, a unit vector k of the ray, a radius of curvature of the surface (j), a distance $q_{j-1}$ from a point $Q_{j-1}$ in the direction of the vector $Q_{j-1}$ to a point $Q_j$, a distance $p_{j-1}$ from the point $Q_{j-1}$ to an intersection point between $Q_{j-1}$ and the perpendicular vector $W_j$, direction components $Wx_j$, $Wy_j$, $Wz_j$ of the vector $W_j$ and the like to obtain $P_{j-1}$, $Wz_j M_j^2$ and $q_j$ (step U41).

$$P_{j-1}=-[x_{j-1}L_{j-1}+y_{j-1}M_{j-1}+(z_{j-1}-d_{j-1})N_{j-1}] \quad (42)$$

$$Wz_j=(z_{j-1}-d_{j-1})+p_{j-1}N_{j-1} \quad (42)$$

$$M_j^2=-[x^2_{j-1}+y^2_{j-1}+(z_{j-1}-d_{j-1})^2-p_{j-1}^2] \quad (43)$$

$$q_{j-1}=p_{j-1}+(cM_{j-1}^2-2Wx_j)/N_{j-1}[1+\{1-(c/N_{j-1}^2)(c_jM_{j-1}^2-2Wx_j)\}^{1/2}] \quad (44)$$

Note that these equations (41) to (44) are such as to be introduced from the following equations (45) to (48).

$$T_{j-1}+p_{j-1}Q_{j-1}=d_{j-1}\cdot k+W_j \quad (45)$$

$$W_j+(q_{j-1}-p_{j-1})\cdot Q_{j-1}=T_j \quad (46)$$

$$T_j+r\cdot E_j=r\cdot k \quad (47)$$

$$n_j\cdot(E_j\times Q_j)=n_{j+1}\cdot(E_j\times Q_{j+1}) \quad (48)$$

Next, as shown in FIG. 21, the processing unit 50 obtains the intersection point $A_j$ coordinate ($x_j$, $y_j$, $z_j$) between the ray and the surface (j) by utilizing the following equations (49) to (51) (step U42).

$$x_j=x_{j-1}+q_{j-1}L_{j-1} \quad (49)$$

$$y_j=y_{j-1}+q_{j-1}M_{j-1} \quad (50)$$

$$z_j=(z_{j-1}-d_{j-1})+q_{j-1}N_{j-1} \quad (51)$$

Next, the processing unit 50 obtains the direction cosine ($L_j$, $M_j$, $N_j$) of the vector Q4 of a light that is incident on the point Aj after refracted on a surface (j+1) from the following equations (52) to (54) and thereafter obtains a coordinate ($X_{j+1}$, $Y_{j+1}$, $Z_{j+1}$) of a point $A_{j+1}$ in a similar procedure to that used above (step U43).

$$L_j=(n/n')\cdot L+g\cdot ex \quad (52)$$

$$M_j=(n/n')\cdot M+g\cdot ey \quad (53)$$

$$N_j=(n/n')\cdot N+g\cdot ez \quad (53)$$

In addition, the processing unit 50 obtains a direction cosine ($e_{xj}$, $e_{yj}$, $e_{zj}$) of a perpendicular vector $E_j$ on the surface (j) at a point A, a refraction ratio (n/n'), a cosine $\zeta_j$ of an angle of incidence on the surface (j) and a cosine $\zeta'_j$ of an angle of exit and a coefficient $g_j$ from the following equations (55) to (58).

$$e_{xj}=-cx_j, e_{yj}=-cy_j, e_z=1-cz_j \quad (55)$$

$$(n/n')=(n\lambda/n'\lambda)=(n'_{(j-1)}\lambda/n'_j\lambda) \quad (56)$$

$$\xi'_j=[1-(n/n')^2\cdot(1-\xi_j^2)]^{1/2} \quad (57)$$

$$g_j=\xi'_j-(n/n')\cdot\xi_j \quad (58)$$

Next, the processing unit 50 determines whether or not the value of the surface number j is k (step U44), and if not k, add 1 to the surface number (step U45) and return to the process in step U41.

On the other hand, if the surface number j is k in step U44, in other words, the direction cosine ($L_j$, $M_j$, $N_j$) of the vector Qj is obtained with respect to the final surface (step U44; Yes), for example, as shown in FIGS. 23A to 30C, the processing unit 50 plots an intersection point (Δx, Δy) between the ray and the final image plane within the display range of the display unit 16 or on the XY coordinates on the display scale (step U46).

Next, the processing unit 50 determines whether or not the value of the variable y is equal to or greater than ys (step U47), and if less than ys (step 47; No), add 1 to the value of the variable y (step U48) and return to the process in step U39.

On the other hand, if the value of the variable y is equal to or greater than ys, in other words, if image points of the incident light are plotted with respect to each of minute areas which align in an y axis direction on the lens surface of the surface of the entrance pupil (step U47; Yes), the processing unit 50 determines whether or not the value of the variable x is equal to or greater than xs (step U49), and if less than xs (step U49; No), add 1 to the variable x (step U50) and return to the process in step U38.

Then, if the value of the variable x is equal to or greater than xs, in other words, if image points of the incident light are plotted with respect to each of minute areas which align in an x axis direction on the lens surface of the surface of the entrance pupil (step U49; Yes), the processing unit 50 evaluates the image forming performance of the zoom lens unit 2 based on spot diagrams so obtained and displays the results of the evaluation at the display unit 16, ending the simulation operation of spot diagram measurement. Thus, since the results of the simulation operation of spot diagram measurement of the zoom lens unit 2 are displayed at the display unit 16, the contents of the design of the zoom lens unit 2 can be evaluated accurately regardless of high-degree expert knowledge and abundant experience. In addition, since the evaluation results by the processing unit 50 are displayed, when compared with a case where the user evaluates the image forming performance, the design contents of the zoom lens unit 2 can be evaluated easily and accurately.

Next, as shown in FIG. 19, the control unit 5 displays at the display unit 16 an instruction to select whether to obtain an MTF property of the designed zoom lens unit 2 through a simulation operation and determines whether or not the implementation of a simulation operation has been selected (step T11).

In step T11, if the implementation of a simulation operation is not selected (step T11; No), the control unit 5 executes a process in step T13, which will be described later on, whereas if the implementation of a simulation operation is selected (step T11; Yes), the processing unit 50 executes a simulation operation of MTF property measurement (step T12).

To be specific, the processing unit 50 calculates an MTF value as |Rt(u)| or |Rs(s)| from the following equation (59) or (60) by utilizing an intensity distribution of spot density as an intensity distribution on an image plane and displays at the display unit 16 the value so calculated as a change in MTF relative to space frequency (u) and a defocusing amount (+/−dz), image height, zooming ratio and the like. In addition, the processing unit 50 evaluates the image forming performance of the zoom lens unit 2 based on the MTF property so obtained and displays the results of the evaluation at the display unit 16. Thus, since the results of the simulation operation of measuring the MTF value of the zoom lens unit 2 are displayed at the display unit 16, the design contents of the zoom lens unit 2 can be evaluated accurately regardless of availability of high-degree expert knowledge and abundant experience. In addition, since the evaluation results by the processing unit 50 are displayed, when compared with a case where the user evaluates the image forming performance, the design contents of the zoom lens unit 2 can be evaluated easily and accurately.

$$|Rt(u)| = \{A(u)^2 + B(u)^2\}^{1/2} \quad (59)$$

$$|Rs(u)| = (1/N)\Sigma_i \cos(2\pi u \cdot \Delta x i) \quad (60)$$

where, in the equations, $\Delta xi$, $\Delta yi$ are spot coordinates, and $A(u)$ and $B(u)$ are values that are expressed by $A(u)=(1/N)\Sigma i \cos(2\pi u \cdot \Delta yi)$, $B(u)=(1/N)\Sigma i \sin(2\pi u \cdot \Delta yi)$.

Note that the processing unit 50 may obtain the MTF value as an amplitude Cm by regarding the basic frequency as uo=1/p[line pair/mm] (p is a basic period) and transforming an intensity distribution I(x) of a grid with a frequency u=m/p=muo (m is a positive integer) using Fourier transform as in the following equations (61), (62) or may obtain the MTF value by performing mockingly so-called slit method and contrast method or transforming point spread function (PSF) and line spread function (LSF) through Fourier transform.

$$I(X) = \Sigma Cm \cdot \exp(-i \cdot 2\pi \cdot mu_o x) \quad (61)$$

$$Cm = \int I(x) \exp(i \cdot 2\pi \cdot mu_o x) dx \quad (62)$$

Next, the control unit 5 displays at the display unit 16 an instruction to select whether to store the design data in the program memory 66 and determines whether or not the storage of the design data has been selected (step T13).

If the storage of the design data is not selected in step T13 (step T13; No), the control unit 5 ends the lens unit design mode.

On the other hand, if the storage of the design data is selected in step T13 (step T13; Yes), the control unit 5 affixes a file name to the design data and stores the data in the program memory 66 (step T14) and ends the lens unit design mode. As this occurs, if the simulation operations have been carried out in the aforesaid steps T6, T8, T10 and T12, the control unit 5 also stores the results of the simulation operations in the program memory 66.

Then, as shown in FIG. 12, the control unit 5 executes various processes based on indicating signals from the control unit 4 (step S20) and ends the processes. Note that the control unit 5 may move the function of the camera 1 to a program design mode and a photographing mode based on the indicating signals so given then.

In addition, if the lens unit design mode is not selected in the step S12 (step S12; No) while the program design mode is selected in step S13 (step S13; Yes), the control unit 5 executes the program design mode.

To be specific, firstly, the control unit 5 receives the customized control program 66d that is inputted via the control unit 4 (step S21). Next, the control unit 5 determines whether or not the design of the customized control program 66d has been completed (step S22), and if not yet completed, (step S22; No), return to the process in step S21, whereas if completed (step S22; Yes), a file name is affixed to the designed customized control program and the designed customized control program to which the file name has so been affixed is then stored in the program memory 66 (step S23), then the program design mode process being ended.

Then, the control unit 5 executes various processes based on indicating signals from the control unit 4 (step S20) and ends the program design mode process.

In addition, if the program design mode is not selected in the step S13 (step S13; No) while a program debugging mode is selected in step 14 (step S14; Yes), the control unit 5 executes a program debugging mode process.

To be specific, firstly, the control unit 5 reads designated control programs and design data (step S24). Then, the control unit 5 executes the control programs so read (step S25), displays the results of the execution at the display unit 16 and stores the results in the program memory 66 (step 26), ending the program debugging mode process.

Then, the control unit 5 performs various processes based on indicating signals from the control unit 4 (step S20) and ends the relevant process.

In addition, if the program debugging mode is not selected in the step S14 (step S14; No) while the customized photographing mode is selected in the step S15 (step S15; Yes), the control unit 5 performs a customized photographing mode process based on the customized control program 66d (step S22).

To be specific, the control unit 5 sets variable design parameters for the zoom lens unit 2 based on the selected customized design data 66b (step S27), and furthermore, the control unit 5 controls the respective units of the camera 1 based on the selected customized control program 66d (step S28) Then, in this state, the control unit 5 performs a photographing according to an instruction from the user and ends the customized photographing mode.

Then, the control unit 5 performs various processes based on instruction signals from the control unit 4 (step S20) and ends the process.

In addition, if the customized photographing mode is not selected in the step S15 (step S15; No) and the other model photographing mode is selected in step S17 (step S17; Yes), the control unit 5 performs a customized photographing mode process based on the mocking control program 66g.

To be specific, the control unit 5 sets variable design parameters for the zoom lens unit based on the selected mocking design data 66f (step S29), and furthermore, the control unit 5 controls the respective units of the camera based on the selected mocking control program 66g (step S30). Then, in this state, the control unit 5 performs a photographing according to an instruction from the user and ends the customized photographing mode.

Then, the control unit 5 performs various processes based on instruction signals from the control unit 4 (step S20) and ends the process.

In addition, if the other model photographing mode is not selected in the step S16 (step S16; No) and the standard photographing mode is selected in step S17 (step S17; Yes), the control unit 5 performs a standard photographing mode process based on the standard control program.

To be specific, firstly, the processing unit 50 sets the focal lengths of the variable-focal-length lenses 3a, 3b to initial values. Here, when the user directs the camera 1 to a subject, rays of light from the subject are incident on the zoom lens unit 2. As this occurs, since the prism 20 is disposed above the variable-focal-length lenses 3a, 3b, rays of light from the lateral direction are guided to the variable-focal-length lenses 3a, 3b which are provided horizontally. In addition, since the variable-focal-length lenses 3a, 3b are provided horizontally, the liquids 31a, 31b are maintained in a stable state. As a result, the flow of the liquids 31a, 31b and the deformation of the optical surfaces S, which would be caused by vibrations, gravitational force and acceleration, are prevented. In addition, the area of the optical surface S is increased compared with a case where the variable-focal-length lenses 3a, 3b are provided vertically, in other words, the F numbers of the variable-focal-length lenses 3a, 3b are reduced, thereby making it possible to improve the brightness of an image.

Next, the control unit 5 sets photographing conditions such as shutter speed and stopping amount based on an operation designating signal from the control unit 4 (step S31).

Next, the processing unit 50 calculates a compensation amount of voltages to be impressed to the variable-focal-length lenses 3a, 3b based on a temperature measured by the temperature sensor 15, metered light amount and subject distance that are metered by the light and distance metering sensor 14 and a contrast that is calculated from an electric signal from the photographing element, and the photographing unit 51 impresses voltages to the variable-focal-length lenses 3a, 3b based on the compensation amount. In addition, the photographing control unit 51 performs a white balance (WB) process on the flash unit 11 based on an instruction signal from the control unit 4 (step S32).

Next, the control unit 5 performs a zooming process and an AF process of the zoom lens unit 2 (step S33) and determines whether or not the shutter release button 41 has been depressed within a predetermined period of time (step S34).

If the shutter release button 41 has been depressed in step S34 (step S34; Yes), the control unit 5 photographs a subject image by controlling the shutter drive unit 62 and the flash unit 11 (step S35). When having performed the photographing, the control unit 5 compresses to encode the image data so photographed at the compression and decompression unit 70 and thereafter stores the encoded image data in the internal memory 68 together with the focal lengths and magnifications of the variable-focal-length lenses 3a, 3b (step S36).

Then, the control unit 5 performs processes based on signals from the control unit 4 and ends the standard photographing mode.

On the other hand, if the shutter release button 41 is not depressed within the predetermined period of time in step S34 or if an instruction is given to change the photographing conditions (step S34; No), the control unit 5 performs processes based on signals from the control unit 4 and thereafter ends directly the standard photographing mode.

Then, the control unit 5 performs various processes based on instruction signals from the control unit 4 (step S20) and ends the process.

In addition, if the standard photographing mode is not selected in the step S17 (step 17; No) and the reproduction mode is selected in step S18 (step S18; Yes), the control unit 5 performs a reproduction mode process as shown in FIG. 13.

To be specific, firstly, the control unit 5 selects image data in the internal memory 68 or the external memory 67a according to an instruction from the user (step S37) and display the image data so selected at the display unit 16 or outputs the data to the external memory 67a (step S38), ending the reproduction mode process.

Then, the control unit 5 performs various processes based on instruction signals form the control unit 4 (step S20) and ends the process.

In addition, if the reproduction mode is not selected in the step S17 (step S17; No), the control unit 5 performs a program setting mode process (step S39).

Figure 24:
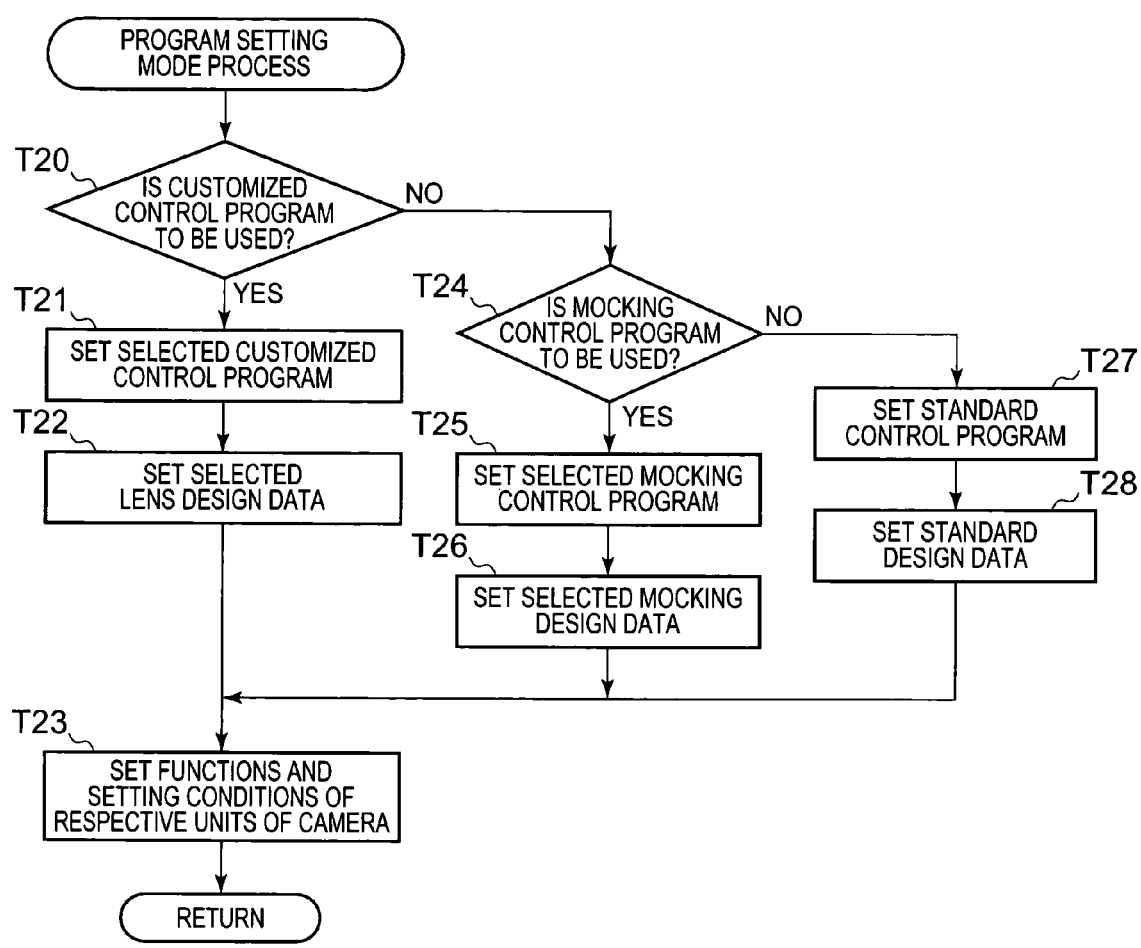
FIG. 24 is a flowchart showing a program setting mode process.

To be specific, as shown in FIG. 24, firstly, the control unit 5 displays at the display unit 16 an instruction to select whether to utilize the customized control program 66d stored in the program memory 66 and determines whether or not the utilization of the customized control program 66d has been selected (step T20).

If the utilization of the customized control program 66d is selected (step T20; Yes) in this step T20, the control unit 5 reads out the customized control program 66d that is selected by the user from the program memory 66 and sets the customized control program 66d as a program for control (step T21).

Next, the control unit 5 reads out, of the standard design data 66a and the customized design data 66b which correspond to the selected customized control program 66d, the design data that is selected by the user from the program memory 66 and sets the design data so read out as data for control (step T22).

Then, the control unit 5 sets functions and setting conditions of the respective units of the camera 1 (step T23) and ends the program setting mode process.

On the other hand, if the utilization of the customized control program 66d is not selected in the step T20 (step T20; No), the control unit 5 displays at the display unit 16 an instruction to select whether to utilize the mocking control program 66g and determines whether or not the utilization of the mocking control program 66d has been selected (step T24).

If the utilization of the aforesaid program is selected in this step T24 (step T24; Yes), the control unit 5 displays sequentially at the display unit 16 the operation guides shown in FIGS. 11A to 11C for selection by the user of the mocking control program 66g and the mocking design data 66f, thereafter reads out the mocking control program 66g so selected from the program memory 66 and sets the mocking control program 66g as a program for control (step T25).

Next, the control unit 5 reads out, of the mocking design data 66f which corresponds to the selected mocking control program 66f, mocking design data that is selected by the user from the program memory 66 and sets this mocking design data 66f as data for control (step T26).

Then, the control unit 5 sets functions and setting conditions for the respective units of the camera 1 (step T23) and ends the program setting mode process.

On the other hand, if the utilization of the mocking control program 66g is not selected in the step T24 (step T24; No), the control unit 5 sets the selected standard control program 66c and the standard design data 66a as program and data for control (steps T27, T28).

Then, the control unit 5 sets functions and setting conditions for the respective units of the camera 1 (step T23) and ends the program setting mode process.

Then, the control unit 5 performs various processes based on indicating signals from the control unit 4 (step S20) and thereafter ends the process.

According to the camera 1 that is configured as has been described heretofore, since the values of the respective variable design parameters can be put in a state in which they have equal optical properties to those of the existing lens unit based on the mocking design data 66f in the program memory 66, there is no need for the user to design an optical unit by himself or herself. Consequently, being from the conventional case, the user can easily obtain the desired optical properties of the zoom lens unit regardless of availability of high-degree expert knowledge and abundant experience.

In addition, since the contents of the mocking design data 66f and the mocking control program 66g can be grasped easily and accurately, the user can obtain the desired optical properties of the zoom lens unit 2 more easily.

Note that while, in this embodiment, the zoom lens unit 2 is described as including the prism 20, the variable-focal-length lenses 3a, 3b and the rigid lens 21 in this order along the optical axis L, the zoom lens unit 2 may include them in another order as shown in, for example, FIG. 25.

In addition, while the variable-focal-length lenses 3a, 3b are described as being disposed closer to the object side than the rigid lens 21 is, they may be disposed on the image side.

Figure 26:
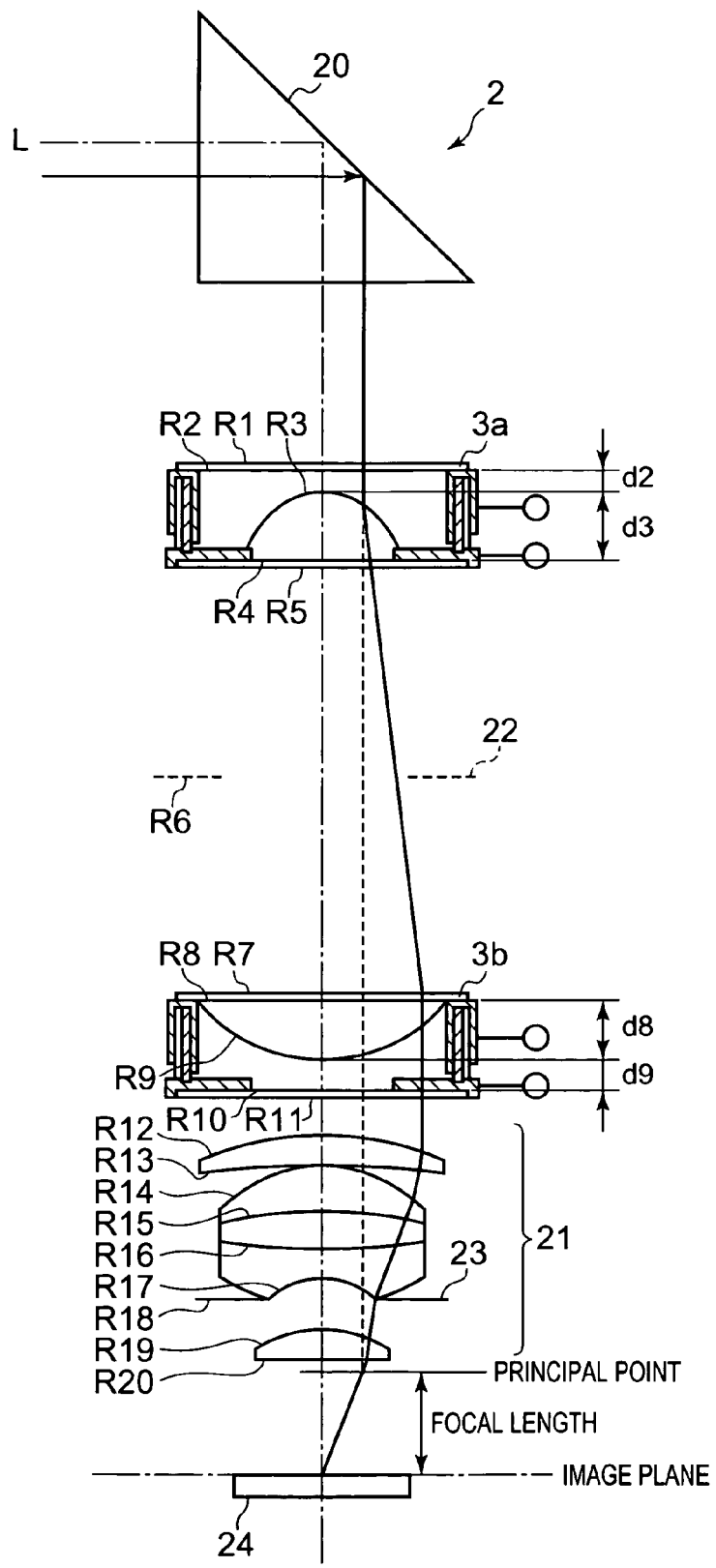

In addition, while the rigid lens 21 is described as being a single lens element, as shown in FIG. 26, the rigid lens 21 may be made up of a lens unit comprising a plurality of lens elements. A zoom lens unit which adopts such a construction can be formed based on such design data as shown in, for example, FIGS. 27A, 27B. Aberration curves and values of aberration coefficients and the like, which result in this case, are illustrated in FIGS. 27C, 27D and FIG. 28, respectively. Here, in FIG. 27B, the "position of a liquid surface" means a distance, as shown in FIG. 26, from the transparent plates 30a, 30b to the center of the interface. In addition, FIG. 27C shows vertical aberration diagrams when the afocal magnification m=0.6 and the focal length f=15 mm, and FIG. 27D shows lateral aberration diagrams when the afocal magnification m=0.6, the focal length f=15 mm and the angle of incidence is 5°. In addition, in FIGS. 27C, 27D, the "line C" means a light with a wavelength of 656.27 nm, the "line d" a light with a wavelength of 87.56 nm and the "line F" a light with a wavelength of 486.13 nm.

In addition, while the incident light that enters from the photographing light in take window 13 is described as being refracted by the prism 20, the incident light may be refracted by a mirror such as a Mangin mirror.

In addition, while the prism 20 of the zoom lens unit 2, the variable-focal-length lenses 3a, 3b and the rigid lens 21 are described as being arranged in the vertical direction, they may be arranged in a lateral or horizontal direction.

In addition, while the variable-focal-length lenses 3a, 3b are described as being stationary, they may be made to be movable by a rack and a pinion and the like. In this case, since the optical properties of the zoom lens unit 2 can be adjusted by adjusting the positions of the variable-focal-length lenses 3a, 3b, the desired optical properties can be obtained more easily. In addition, even in a case where there is a limitation on the variable area of the optical properties of the variable-focal-length lenses 3a, 3b, the refracting force of the zoom lens unit 2 is deflected to the positive or negative side through position adjustment, whereby the focal length and focusing position of the whole zoom lens unit can be adjusted over a wide range.

In addition, while the variable-focal-length lenses 3a, 3b are described as changing the refracting force by deforming the optical surfaces S, the liquids 31a, 31b may be replaced with other liquids having different refractive indices to thereby change the refracting force.

In addition, while the processing unit 50 is described as evaluating the image forming performance of the zoom lens unit 2 by obtaining the MTF property through the simulation operation, the image forming performance may be evaluated by obtaining an OTF (Optical Transfer Function) property and a PTF (Phase Transfer Function) property, or the image forming performance may be evaluated by transforming the MTF value and the OTF value to evaluation data for plane aberration, or the image forming performance may be evaluated by the so-called Nitka method, Rudinger & Spiegler method, and resolving power method.

In addition, while the optical unit according to the invention is described as being applied to the zoom lens unit 2, the optical unit of the invention may be applied to a fixed-focus lens by making only one of the variable design parameters variable and the remaining variable design parameters stationary. In this case, when compared with the case where the optical unit functions as the zoom lens unit, the optical properties can be increased, and the control is made easy.

In addition, while the optical unit according to the invention is described as being incorporated in the camera 1, the optical unit of the invention may be incorporated in a telescope, a microscope and a binocular.

<Modification to the Embodiment>

Next, a modification to the embodiment of the invention will be described. Note that like reference numerals are imparted to like constituent elements to those described in the embodiment, and the description thereof will be omitted.

Figure 29:
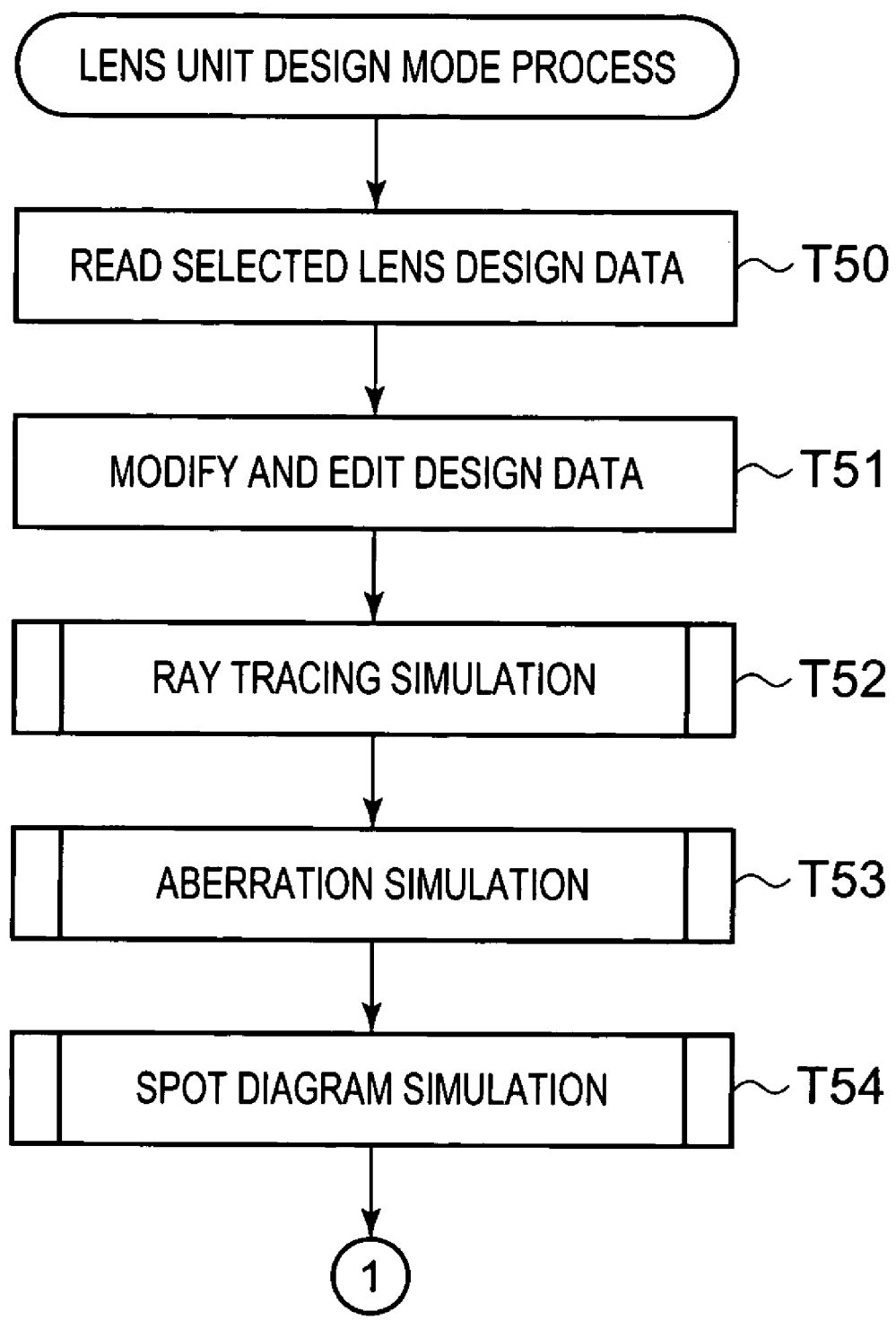
FIGS. 29 and 30 are flowcharts showing a lens unit setting mode process.
Figure 30:
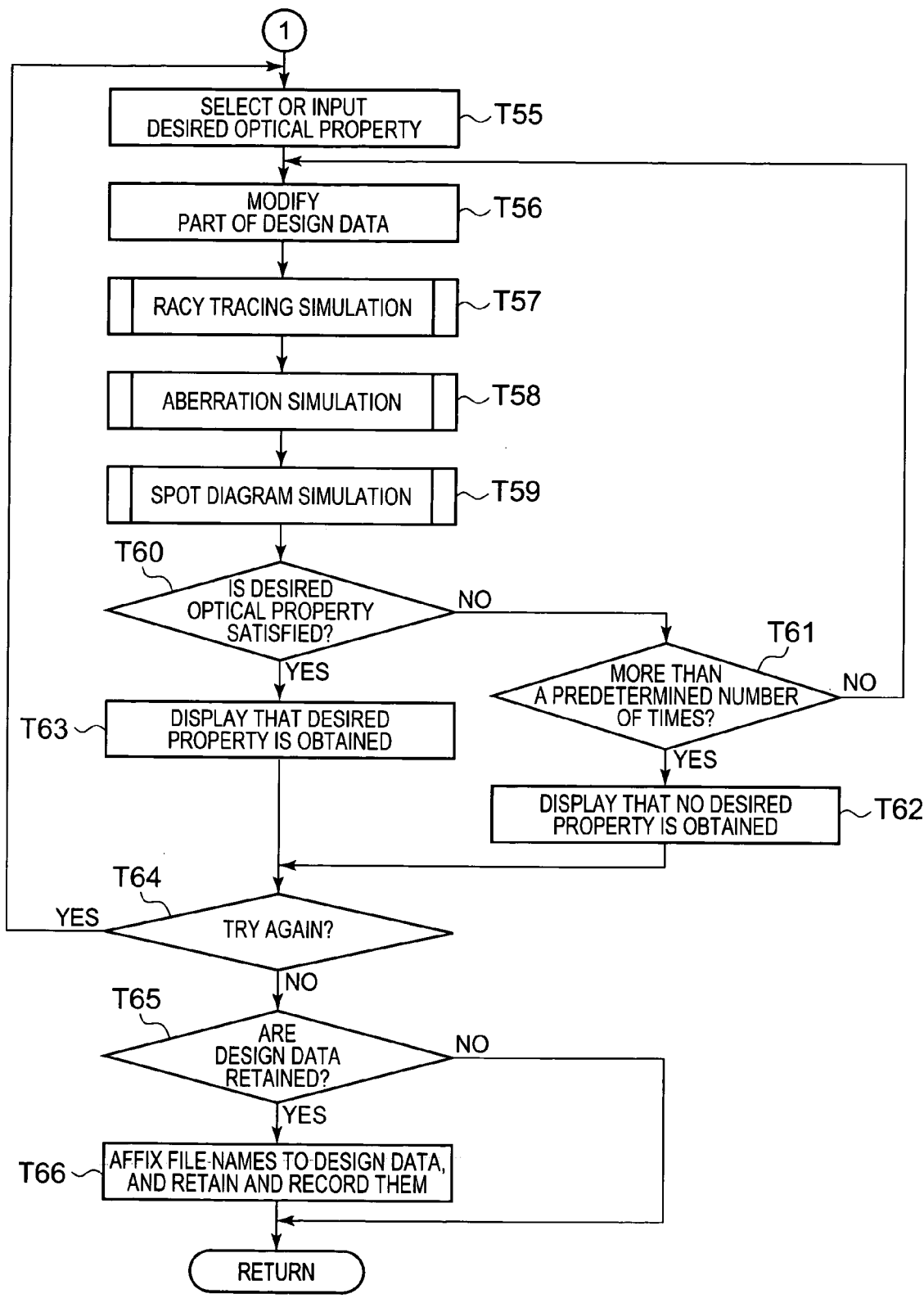

As shown in FIGS. 29, 30, a processing unit 50A of a camera 1 according to this modification is designed to perform a different lens unit design mode process from the process that is performed by the processing unit 50 in the previous embodiment.

Figure 31E:
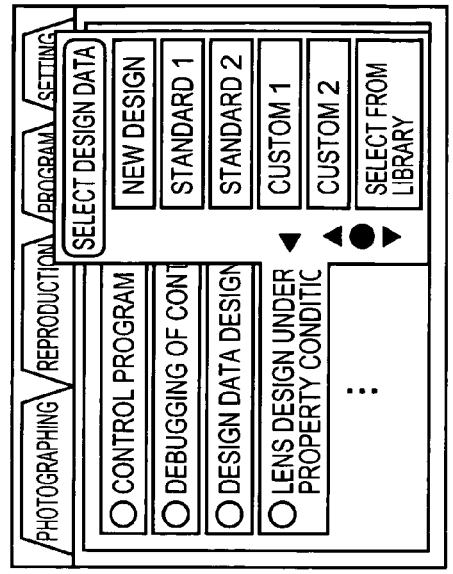
Figure 31F:
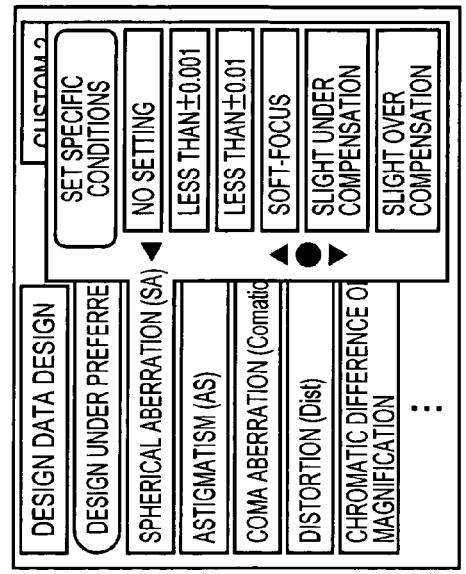
Figure 31G:
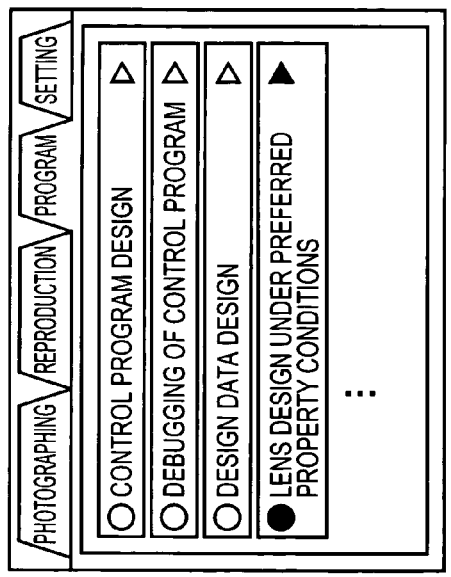
Figure 31H:
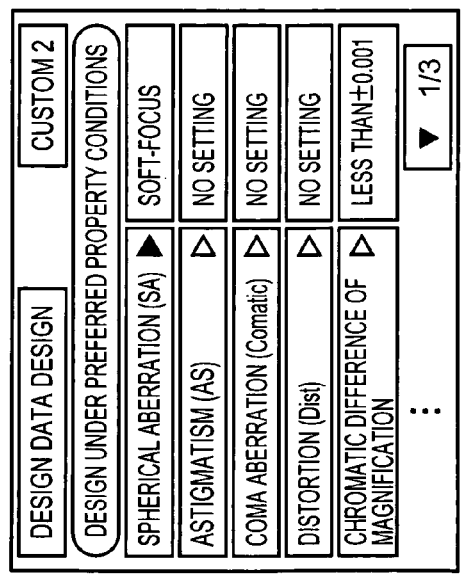

To be specific, firstly, the processing unit 50A displays, as shown in FIGS. 31A to 31C, at the display unit 16 operation guides for selection of design data by the user and reads out standard design data 66a, customized design data 66b or mocking design data 66f that is so selected from a program memory 66 (step T50). Note that in FIGS. 31A to 31C, of the customized design data 66b, design data filed under a file name of "Custom 2" is read.

Next, the processing unit 50A receives an instruction to modify or edit the design data via a control unit 4 (step T51).

Next, similar to the previously described steps T6, T8, T10, the processing unit 50A performs a racy tracing simulation operation, an aberration measuring simulation operation and a spot diagram measuring simulation operation and displays, as shown in FIG. 31D, at the display unit 16 the results of the simulation operations (steps T52 to T54). Note that as this occurs, the processing unit 50A may perform measuring simulation operations for other optical properties such as an MTF property and the like and display the results of the simulation operations.

Next, as shown in FIG. 30, the processing unit 50A receives a designation of a desired optical property by the user via the control unit 4 (step T55). Here, as instructions inputted into the control unit 4 by the user are, as shown in FIGS. 31E to 31H, an instruction that the permissible amount of spherical aberration is made to be less than +/−0.001, an instruction that the zoom lens unit 2 is made to be a soft-focus lens unit for soft-focus photographing and an instruction that the compensation amount of spherical aberration is increased or decreased.

Next, the processing unit 50A modifies part of the design data so that the optical properties of the zoom lens unit 2 approach optical properties selected by the user (step T56).

Next, similar to the previously described steps T6, T8, T10, the processing unit 50A performs a racy tracing simulation operation, an aberration measuring simulation operation and a spot diagram measuring simulation operation on the zoom lens unit 2 after the design data have been modified and displays at the display unit 16 the results of the simulation operations (steps T57 to T59). Note that as this occurs, the processing unit 50A may perform measuring simulation operations for other optical properties such as an MTF property and the like and display the results of the simulation operations.

Next, the processing unit 50A allows the user to select or input optical properties information related to the desired optical properties and determines whether or not the optical properties designated by the optical properties information are approximate to the optical properties of the zoom lens unit 2 after the design data have been modified (step T60).

If the optical properties are determined not to be approximate in this step T60 (step T60; No), the processing unit 50A determines whether or not the determination in step T60 has been performed a predetermined number of times (step T61), and if the number of times of execution of the determination is less than the predetermined number of times (step T61; No), then return to the step T56. In addition, if the number of times of execution of the determination is equal to or more than the predetermined number of times (step T61; Yes), the processing unit 50A displays at the display unit 16 that the desired optical properties by the user cannot be obtained (step T62), and the processing unit 50A performs a process in step T64, which will be described below.

On the other hand, if the optical properties are determined to be approximate in the step T60, that is, if the optical properties desired by the user are satisfied (step T60; Yes), the processing unit 50A so displays at the display unit 16 (step T63).

Next, the processing unit 50A displays at the display unit 16 an instruction to select whether to redesign the zoom lens unit 2 and determines whether or not the redesigning of the zoom lens unit 2 has been selected (step T64).

If the redesigning is selected in this step T64 (step T64; Yes), the processing unit 50A returns to the process in the step T55. On the other hand, if the redesigning is not selected (step T64; No), the processing unit 50A displays at the display unit 16 an instruction to select whether to store design data in the program memory 66 (step T65).

If the storage of the design data is not selected in this step T65 (step T65; No), the processing unit 50A ends directly the lens unit designing mode process, whereas if the storage is selected (step T65; Yes), the processing unit 50A affixes file names to the design data and the results of a simulation operation carried out for storage in the program memory 66 (step T66).

Thus, according to the camera 1, since part of the design data is modified so that the optical properties of the zoom lens unit 2 approach to the desired optical properties of the user, the desired optical properties for the zoom lens unit 2 can be obtained in a secure fashion.

Thus, by adopting the lens unit or the camera incorporating the lens unit which can program an optical property, comprising, a plurality of optical elements which are disposed on an optical axis of the lens unit, an electronic control unit for changing an optical property of the whole lens unit by changing the state of the plurality of optical elements within the lens unit through electronic control, a storage unit for storing control information for controlling the state of the plurality of optical elements so that a predetermined optical property of the whole lens unit falls within a predetermined range of a whole range that can be changed by the electronic control unit, a selection unit for selecting one of the control information stored in the storage unit as control information for controlling the state of the plurality of optical elements at the time of photographing, and a photographing control unit for controlling the state of the plurality of optical elements that is changed by the electronic control unit based on the control information selected by the selection unit at the time of photographing, the optical properties of the lens unit can be adjusted over the wide range without exchanging lenses, and the user can easily obtain the desired optical properties of the optical unit regardless of availability of high-degree expert knowledge and abundant experience.

Here, the lens unit may adopt a form in which the lens unit is detachably attached to the camera or may be made up of a plurality of groups of lenses which are incorporated in the camera.

In addition, optical elements that make up the lens unit may be such as a lens type optical elements that transmits light in a straight line, a reflecting mirror type optical elements that reflect light or a prism type optical elements that bends light.

In addition, each optical element itself may made up of a partially formed group of a plurality of lenses (reflecting mirror, prism and the like).

In addition, the optical property with respect to the optical path of the whole lens unit means the focal length of the whole lens unit (in the event that the lens unit is made to function as a fixed-focus lens, a focal length that is fixed at the time of photographing, whereas in the event that the lens unit is made to function as a zoom lens, a range of focal length that can be adjusted by zooming operation at the time of photographing), the focal point position (focusing position) of the whole lens unit, light trace property, OTF property, image forming property and the like. These are such as to exclude optical properties such as transmittance (brightness) of the lens which is not related to the optical path of the whole lens unit.

In addition, the state of the plurality of optical elements that is changed by the electronic control unit is the state of various types of lens design parameters (variable design parameters) which include positions on the optical axis of the respective optical elements within the lens unit and the focal length of each of the respective optical elements. The positions on the optical axis of the respective optical elements in the lens unit may be such as to be designated by a relative distance between the respective optical elements, and the focal length of each of the respective optical elements may be such as to be designated by the curvature of the lens surface, the refractive index (material) of the lens, the curvature of the reflecting mirror and the like.

In addition, while the control of the state of the plurality of optical elements based on the designated contents is controlled according to the control information, this control information may be configured in such a manner as to be incorporated in the standard control program and the customized control program, or this control information may be stored as lens design data such as the standard design data and the customized design data, and the control program may control the state of the plurality of optical elements based on the lens design data. In addition, the control information may store lens design parameters in the default state, and in other states, the control information may be calculated each time based on the lens design parameters in the default state. In addition, lens parameters in a plurality of states may be stored.

In addition, that the optical property related to the optical path of the whole lens unit is made to fall within part of the range may be that a specific range of the optical property is restricted or fixed or that the state of combination of a plurality of optical properties is restricted or fixed.

The invention claimed is:

1. A camera which incorporates a lens unit which can program an optical property, comprising:
   a plurality of optical elements which are disposed on an optical axis of the lens unit;
   an electronic control unit for changing an optical property of the lens unit by changing a state of at least one of the plurality of optical elements within the lens unit through electronic control;
   a storage unit for storing a plurality of pieces of control information for controlling the state of at least one of the plurality of optical elements so that a predetermined optical property of the lens unit falls within a predetermined range of a range that can be changed by the electronic control unit;
   a selection unit for selecting a piece of the control information stored in the storage unit to control the state of at least one of the plurality of optical elements at a time of photographing;
   a photographing control unit for controlling the state of said at least one of the plurality of optical elements after the electronic control unit has changed said state based on the piece of the control information after the piece of information is selected by the selection unit at the time of photographing; and
   a mode selection unit which allows a user to select arbitrarily a photographing mode and a design mode,
   wherein, when the design mode is selected, the piece of control information which makes the lens unit function as a lens unit having a desired optical property according to an instructing operation by the user is prepared and is stored in the storage unit, and
   wherein when the photographing mode is selected, the lens unit is made to function as a lens unit having a desired optical property based on the piece of control information stored in the storage unit.

2. A camera as set forth in claim 1,
   wherein the storage unit stores the plurality of pieces of control information which are different in range where the predetermined optical property can be changed, and
   wherein the selection unit selects a piece of control information from the plurality of pieces of control information stored in the storage unit based an instructing operation by a user.

3. A camera as set forth in claim 2, comprising:
   a preparation unit for preparing a piece of control information arbitrarily according to an instructing operation of the user; and
   an additional storage unit for additionally storing the plurality of pieces of control information prepared by the preparation unit in the storage unit.

4. A camera as set forth in claim 2, comprising:
   an editing unit for editing arbitrarily the plurality of pieces of control information stored in the storage unit according to an instructing operation of the user; and
   an updating unit for updating the plurality of pieces of control information stored in the storage unit according to editing details determined by the editing unit.

5. A camera as set forth in claim 2,
   wherein the storage unit stores the plurality of pieces of control information and information on an optical property corresponding to the plurality of pieces control information which are related to each other, and
   wherein the selection unit displays as selection candidates pieces of information related to optical properties which correspond to the plurality of pieces of information stored in the storage unit and allows the user to select from the displayed selection candidates a piece of information which is related to a single optical property to thereby select a corresponding piece of information.

6. A camera as set forth in claim 5,
   wherein the storage unit stores at least one of a plurality of pieces of information in the form of a design drawing, a sectional diagram, and a ray tracing chart of the lens unit as information related to the optical property, and
   wherein the section unit displays one or a plurality pieces of image information in the form of a design drawing, a sectional diagram, and a ray tracing chart of the lens unit as selection candidates.

7. A camera as set forth in claim 5,
   wherein the storage unit stores the plurality of pieces of control information used when making the lens unit incorporated in the camera mock an optical property possessed by an existing lens unit or an existing camera and information used to specify an existing lens unit or an existing camera which corresponds to the plurality of pieces of control information which are related to each other, and
   wherein the selection unit displays as selection candidates pieces of information which can specify the existing lens unit or the existing camera and allows the user to select a single existing lens unit or camera from the displayed selection candidates to thereby select corresponding information.

8. A camera as set forth in claim 7,
   wherein the storage unit stores, as information which can specify the existing lens unit or the existing camera, one or a plurality of pieces information in the form of product name, product number, manufacturer's name and external view of the existing lens unit or the existing camera, and
   wherein the selection unit displays one or a plurality of pieces of information in the form of product name, product number, manufacturer's name and external view of the existing lens unit or the existing camera as selection candidates.

9. A camera as set forth in claim 2, comprising:
   a designating unit which allows the user to designate arbitrarily a condition determining which optical property of the lens unit falls in which range;

a primary generating unit for automatically generating at least one of a plurality of pieces of control information for controlling the state of at least one of the plurality of optical elements such that the condition designated by the designating unit is satisfied; and a storage control unit for storing the plurality of pieces control information that is automatically prepared by the primary generating unit in the storage unit.

10. A camera as set forth in claim 9, comprising:

a secondary generating unit for automatically generating a plurality of lens design data which regulates the state of at least one of the plurality of optical elements;

a calculation unit for calculating optical properties of the lens unit which correspond, respectively, to the plurality of lens design data that are automatically generated by the secondary generating unit; and a determination unit which determines whether or not the respective optical properties that are calculated by the calculation unit satisfy the condition designated by the designating unit; wherein the first primary generating unit generates at least one of the plurality of pieces of control information for controlling the state of at least one of the plurality of optical elements so as to satisfy the condition designated by the designating unit based on lens design data which correspond to the optical property that is determined to satisfy the condition by the determination unit.

11. A camera as set forth in claim 1, wherein the mode selection unit allows the user to select arbitrarily a setting mode in addition to the photographing mode and the design mode, wherein when the setting mode is selected, any one of the plurality of pieces of control information stored in the storage unit is set to be utilized at the time of photographing according to an instructing operation by the user, and wherein when the photographing mode is selected, the lens unit is made to function as a lens unit having a desired optical property based on, of the plurality of pieces of control information stored in the storage unit, a piece of control information that is set when the setting mode is selected.

12. A camera as set forth in claim 1, wherein the electronic control unit changes the positions on the optical axis of the optical elements within the lens unit through electronic control.

13. A camera as set forth in claim 1, wherein the electronic control unit changes the focal length of each of the optical elements through electronic control.

14. A camera as set forth in claim 1, wherein the optical property of the lens unit is an optical property that relates to an optical path of the lens unit.

15. A camera as set forth in claim 1, wherein the storage unit stores a plurality of pieces of control information used to make the lens unit function as a predetermined fixed-focus lens unit or a predetermined zoom lens unit, and the respective pieces of control information store pieces of control information which control the state of at least one of the plurality of optical elements so that the ranges of the focal lengths that can be adjusted differ from each other and the image forming performances differ from each other; and wherein the photographing control unit makes the lens unit function as a predetermined fixed-focus lens unit or a predetermined zoom lens unit according to the selection by the selection unit.

16. A camera as set forth in claim 15, wherein the storage unit stores a primary piece of control information used to make the lens unit function as a telephoto zoom lens unit in which the variable range of the focal length is set to correspond a higher zooming magnification and a secondary piece of control information used to make the lens unit function as a wide-angle zoom lens in which the variable range of the focal length is set to correspond to a lower zooming magnification, and wherein the photographing unit makes the lens unit function as the telephoto zooming lens or the wide-angle zoom lens according to the selection of either the primary piece of control information or the secondary piece of control information by the selection unit.

17. A camera as set forth in claim 2, comprising:

a reception unit for receiving the plurality of pieces of control information through communication with the outside; and a additional storage unit for additionally storing the plurality of pieces of control information received by the reception unit.

18. A lens unit which can program an optical property, comprising:

a detachable unit adapted to be detached from a camera;

a plurality of optical elements disposed on an optical axis of the lens unit;

an electronic control unit for changing an optical property of the lens unit by changing a state of at least one of the plurality of lens elements within the lens unit through electronic control;

an obtaining unit for obtaining one of a plurality of pieces of control information for controlling the state of at least one of the plurality of optical elements so that a predetermined optical property of the lens unit falls within a predetermined range of a range that can be changed by the electronic control unit;

a photographing control unit for controlling the state of at least one of the plurality of optical elements after the electronic control unit has changed said state based on one of the plurality of pieces of control information obtained by the obtaining unit at the time of photographing; and a mode selection unit which allows the user to select arbitrarily a photographing mode and a design mode, wherein when the design mode is selected, the piece of control information which makes the lens unit function as a lens unit having a desired optical property according to an instructing operation by the user is prepared and is stored in the storage unit, and wherein when the photographing mode is selected, the lens unit is made to function as a lens unit having a desired optical property based on the piece control information stored in the storage unit.

19. A lens unit as set forth in claim 18, wherein the obtaining unit obtains the plurality of pieces of control information from an external device.

20. A lens unit as set forth in claim 18, wherein the obtaining unit obtains one of a plurality of pieces of control information which are stored in advance in the interior of the lens unit.

21. A lens unit as set forth in claim 18, comprising a communication unit which communicates with the camera when the communication unit is installed in the camera.

22. A method for controlling a camera incorporating an electronic control unit for changing a state of at least one of a plurality of optical elements disposed on an optical axis of a lens unit through electronic control to thereby change an optical property with respect to an optical path of the lens unit, comprising the steps of:

setting an operation mode of the camera to a design mode;
preparing the plurality of pieces of control information for controlling a state of at least one of the plurality of optical instruments so that a predetermined optical property of the lens unit falls within a predetermined range of a range that can be changed by the electronic control unit;
setting the operation mode of the camera to a setting mode;
selecting a piece of prepared control information as a piece of control information that is to be used for control at the time of photographing when the setting mode is set;
setting the operation mode of the camera to a photographing mode; and
controlling the state of at least one of the plurality of optical elements after the electronic control unit has changed said state based on the selected pieces of information so that the optical property with respect to an optical path of the lens unit falls within part of the range that can be changed by the electronic control unit
selecting arbitrarily a photographing mode and a design mode,
wherein, when the design mode is selected, the piece of control information which makes the lens unit function as a lens unit having a desired optical property according to an instructing operation by the user is prepared and is stored in the storage unit, and
wherein when the photographing mode is selected, the lens unit is made to function as a lens unit having a desired optical property based on the piece of control information stored in the storage unit.

* * * * *